United States Patent
Losee et al.

(10) Patent No.: US 11,323,382 B1
(45) Date of Patent: May 3, 2022

(54) DYNAMIC BANDWIDTH THROTTLING OF A NETWORK DEVICE COMPONENT FOR TELECOMMUNICATIONS STANDARD COMPLIANCE

(71) Applicant: Juniper Networks, Inc., Sunnyvale, CA (US)

(72) Inventors: Jon G. Losee, Los Altos Hills, CA (US); Frederick C. Moore, Londonderry, NH (US); Michael Taylor, Bolton, MA (US); James Deluco, Stow, MA (US); Scott A. Gigandet, Groveland, MA (US); Dibyendu K. Sen, Sunnyvale, CA (US); John D. Johnson, Los Altos, CA (US); Eswaran Srinivasan, Fremont, CA (US); David Hahm, Mountian View, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 16/947,414

(22) Filed: Jul. 31, 2020

(51) Int. Cl.
*H04L 47/32* (2022.01)
*H04L 47/22* (2022.01)
(Continued)

(52) U.S. Cl.
CPC ........... *H04L 47/32* (2013.01); *H04L 47/22* (2013.01); *H04L 49/40* (2013.01); *G06F 1/20* (2013.01)

(58) Field of Classification Search
CPC ........... H01L 2225/06589; H01L 23/34; H01L 25/18; H01L 25/0655; H01L 23/473; H01L 25/0657; H01L 23/3675; H04L 47/32; H04L 47/22; H04L 49/40; H04L 9/0643; H04L 41/0896; H04L 47/10; G06F 1/20; G06F 12/0246; G06F 1/3225; G06F 1/08; G06F 12/0835; G06F 13/1631; G06F 11/3089; G06F 1/26; G06F 12/0802; G06F 13/1642; G06F 1/206; G06F 1/3275; G06F 1/324; G06F 13/1668; G06F 3/061;
(Continued)

(56) References Cited

U.S. PATENT DOCUMENTS

| | | | |
|---|---|---|---|
| 9,411,400 B1 * | 8/2016 | Dropps | G06F 1/3234 |
| 9,432,298 B1 * | 8/2016 | Smith | H04L 49/9057 |

(Continued)

*Primary Examiner* — Wutchung Chu
(74) *Attorney, Agent, or Firm* — Harrity & Harrity, LLP

(57) ABSTRACT

A network device may receive traffic to be processed by a routing component, and may determine temperatures of an ASIC and an HBM of the routing component at a first time. The network device may determine whether the temperature of the ASIC satisfies a first ASIC temperature threshold or a second ASIC temperature threshold, and may determine whether the temperature of the HBM satisfies a first HBM temperature threshold or a second HBM temperature threshold. The network device may selectively throttle processing of the traffic by a first quantity when the temperature of the ASIC satisfies the first ASIC temperature threshold or the temperature of the HBM satisfies the first HBM temperature threshold, or throttle the processing of the traffic by a second quantity when the temperature of the ASIC satisfies the second ASIC temperature threshold or the temperature of the HBM satisfies the second HBM temperature threshold.

20 Claims, 15 Drawing Sheets

(51) Int. Cl.
*H04L 49/40* (2022.01)
*G06F 1/20* (2006.01)

(58) Field of Classification Search
CPC .. G06F 3/0659; G06F 1/3206; G06F 12/0811; G06F 12/0862; G06F 3/0604; G06F 3/0611; G06F 3/0613; G06F 13/28; G06F 13/4027; G06F 13/4282; G06F 11/1048; H03K 19/00369; G11C 11/4093; G11C 11/406; G11C 16/3418; G11C 5/025; G06T 1/20; G06N 3/063; G06N 3/0454; G06N 3/08

See application file for complete search history.

(56) References Cited

U.S. PATENT DOCUMENTS

| | | | |
|---|---|---|---|
| 10,304,755 B1* | 5/2019 | Yatskov | H01L 23/4006 |
| 2017/0303438 A1* | 10/2017 | Shabbir | H05K 7/20736 |
| 2018/0108642 A1* | 4/2018 | Sauter | H01L 25/50 |
| 2020/0105722 A1* | 4/2020 | Sethuraman | H01L 25/0657 |
| 2021/0112686 A1* | 4/2021 | Dogruoz | H01L 23/427 |

* cited by examiner

DYNAMIC BANDWIDTH THROTTLING OF A NETWORK DEVICE COMPONENT FOR TELECOMMUNICATIONS STANDARD COMPLIANCE

BACKGROUND

Network devices and components of network devices require compliance with telecommunications standards. For example, to be in compliance with a network equipment building system (NEBS) standard, network device components need to be operational (e.g., not exceed maximum temperature thresholds for the components) at a particular temperature (e.g., fifty-five degrees Celsius) and a particular altitude (e.g., 1,828.8 meters or 6,000 feet), which corresponds to sixty-one degrees Celsius at temperature at sea level (e.g., a one degree Celsius increase for every 1,000 feet of altitude).

SUMMARY

In some implementations, a method may include receiving traffic to be processed by a routing component of a line card of a network device, and determining temperatures of an application-specific integrated circuit (ASIC) and a high bandwidth memory (HBM) of the routing component at a first time. The method may include determining whether the temperature of the ASIC satisfies a first ASIC temperature threshold or a second ASIC temperature threshold, and determining whether the temperature of the HBM satisfies a first HBM temperature threshold or a second HBM temperature threshold. The method may include selectively throttling processing of the traffic, by the routing component, by a first quantity when the temperature of the ASIC satisfies the first ASIC temperature threshold or the temperature of the HBM satisfies the first HBM temperature threshold, or throttling the processing of the traffic, by the routing component, by a second quantity when the temperature of the ASIC satisfies the second ASIC temperature threshold or the temperature of the HBM satisfies the second HBM temperature threshold.

In some implementations, a network device may include one or more memories and one or more processors to receive traffic to be processed by a routing component of a line card of the network device, and determine temperatures of an ASIC and an HBM of the routing component at a first time. The one or more processors may determine whether the temperature of the ASIC satisfies a first ASIC temperature threshold or a second ASIC temperature threshold, and may determine whether the temperature of the HBM satisfies a first HBM temperature threshold or a second HBM temperature threshold. The one or more processors may selectively throttle processing of the traffic, by the routing component, by a first quantity when the temperature of the ASIC satisfies the first ASIC temperature threshold or the temperature of the HBM satisfies the first HBM temperature threshold, or throttle the processing of the traffic, by the routing component, by a second quantity when the temperature of the ASIC satisfies the second ASIC temperature threshold or the temperature of the HBM satisfies the second HBM temperature threshold. The one or more processors may generate an alarm message indicating the throttling of the processing of the traffic by the first quantity or the second quantity.

In some implementations, a non-transitory computer-readable medium may store one or more instructions that, when executed by one or more processors of a network device, cause the one or more processors to receive traffic to be processed by a routing component of a line card of the network device, and determine temperatures of an ASIC and an HBM of the routing component at a first time. The one or more instructions may cause the one or more processors to determine whether the temperature of the ASIC satisfies a first ASIC temperature threshold or a second ASIC temperature threshold, and determine whether the temperature of the HBM satisfies a first HBM temperature threshold or a second HBM temperature threshold. The one or more instructions may cause the one or more processors to selectively throttle processing of the traffic, by the routing component, by a first quantity when the temperature of the ASIC satisfies the first ASIC temperature threshold or the temperature of the HBM satisfies the first HBM temperature threshold, or throttle the processing of the traffic, by the routing component, by a second quantity when the temperature of the ASIC satisfies the second ASIC temperature threshold or the temperature of the HBM satisfies the second HBM temperature threshold. The one or more instructions may cause the one or more processors to determine temperatures of the ASIC and the HBM of the routing component at a second time that occurs after the first time, and increase the processing of the traffic, by the routing component, by the first quantity when the temperature of the ASIC satisfies a third ASIC temperature threshold or the temperature of the HBM satisfies a third HBM temperature threshold.

DETAILED DESCRIPTION

Figure 1A:
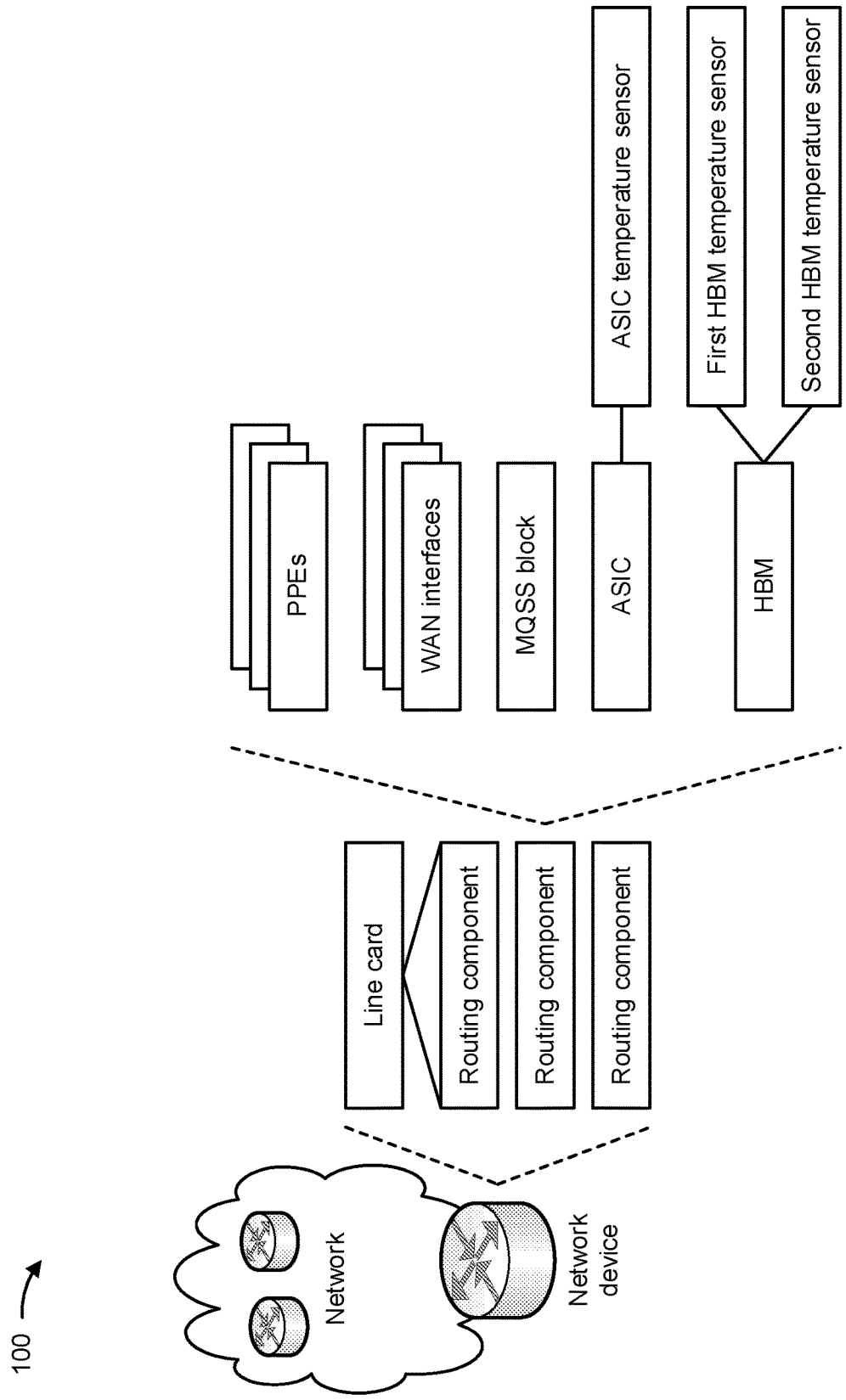
FIGS. 1A-1K are diagrams of an example implementation described herein.

The following detailed description of example implementations refers to the accompanying drawings. The same reference numbers in different drawings may identify the same or similar elements.

When an ambient temperature of a network device is, for example, sixty-one degrees Celsius, cooling down hardware components of the network device becomes a challenge, especially for hardware components associated with routing engines of a line card of the network device. For example, an application-specific integrated circuit (ASIC) and a high bandwidth memory (HBM) of the routing engine may generate excessive amounts of heat. The excessive amounts of heat generated by the ASIC and the HBM cause an alarm condition to be triggered in the network device. When the alarm condition is triggered, the line card is shut down by an environmental policy of the network device (e.g., due to the line card exceeding a maximum temperature threshold), which precludes the network device from complying with the NEBS standard. This problem may be usually addressed by utilizing fewer routing engines in a line card and large and expensive heat sinks. Thus, current techniques for providing NEBS-compliant network devices waste computing resources (e.g., processing resources, memory resources, communication resources, and/or the like), networking resources, and/or the like associated with providing network devices with less capabilities, utilizing expensive and space consuming heat sinks, and/or the like.

Some implementations described herein relate to a network device that provides dynamic bandwidth throttling of a network device component for telecommunications standard compliance. For example, the network device may receive traffic to be processed by a routing component of a line card of the network device, and may determine temperatures of an ASIC and an HBM of the routing component at a first time. The network device may determine whether the temperature of the ASIC satisfies a first ASIC temperature threshold or a second ASIC temperature threshold, and may determine whether the temperature of the HBM satisfies a first HBM temperature threshold or a second HBM temperature threshold. The network device may selectively throttle processing of the traffic, by the routing component, by a first quantity when the temperature of the ASIC satisfies the first ASIC temperature threshold or the temperature of the HBM satisfies the first HBM temperature threshold, or throttle the processing of the traffic, by the routing component, by a second quantity when the temperature of the ASIC satisfies the second ASIC temperature threshold or the temperature of the HBM satisfies the second HBM temperature threshold.

In this way, the network device may provide dynamic bandwidth throttling of the network device component for telecommunications standard compliance. For example, the network device may be designed to operate in a NEBS temperature environment (e.g., to comply with the NEBs standard), which includes ambient temperatures up to sixty-one degrees Celsius at sea level. The network device need not utilize less routing engines per line card and does not require expensive heat sinks to dissipate heat. This, in turn, conserves computing resources (e.g., processing resources, memory resources, communication resources, and/or the like), networking resources, and/or the like that would otherwise have been used in providing network devices with less capabilities (e.g., less routing engines), utilizing expensive and space consuming heat sinks, and/or the like.

The term "throttling," as used herein, may be broadly defined to include reducing bandwidth by dropping traffic while still maintaining a quality of service. That is, when throttling, best effort traffic may be dropped before other higher priority traffic. Furthermore, although implementations described herein relate to NEBS and telecommunications standard, the implementations may also be utilized to prevent an overheating condition even in non-NEBS environments; to prevent chassis or line card shutdown in the event of a marginal component issue; during a failure of a fan in the network device; to throttle performance in certain data center applications at 40 degrees Celsius and 6,000 feet (e.g., a network device may include a particular performance at 25-35 degrees Celsius, and reduced performance during maximum operating conditions of 40 degrees Celsius and 6,000 feet).

FIGS. 1A-1K are diagrams of one or more example implementations 100 described herein. As shown in FIG. 1A, a network may include multiple network devices. The network may include one or more wired and/or wireless networks. Each network device may include a device capable of receiving, processing, storing, routing, and/or providing traffic (e.g., a packet, other information or metadata, and/or the like) in a manner described herein.

As further shown in FIG. 1A, the network device may include one or more line cards, and each line card may include one or more routing components. Each routing component may include one or more packet processing engines (PPEs), one or more wide area network (WAN) interfaces, a memory enqueueing subsystem (MQSS) block, an ASIC, an HBM, an ASIC temperature sensor, and one or more HBM temperature sensors (e.g., a first HBM temperature sensor and a second HBM temperature sensor).

The line card may include a circuit board that provides interfaces to the network (e.g., a local area network (LAN), a WAN, and/or the like), and that terminates lines supporting telecommunications services, fiber optic services, and/or the like. Since the network device may terminate hundreds, thousands, and/or the like of lines, the line card may include tens, hundreds, and/or the like, line terminations and the network device may include tens, hundreds, and/or the like, line cards.

The routing component may include a component that provides Layer 2 and Layer 3 packet switching, packet forwarding, route lookup functions, and/or the like. The routing component may be implemented in one or more ASICs that are physically located on port interface cards (PICs), flexible PIC concentrators (FPCs), and/or the like. The routing component may include a Layer 2 and Layer 3 packet processing ASIC that performs Layer 2 and Layer 3 encapsulation and de-encapsulation, and manages division and reassembly of packets within the network device; queuing and memory interface ASICs that manage buffering of data cells in memory and queueing of notifications; a processor that performs route lookup; switch interface ASICs that extract a route lookup key and manage a flow of data cells across a switch fabric; media-specific ASICs that perform control functions tailored to media types; and/or the like.

The PPE may receive packets, distinguish header and payload information for the packets, outsource decision-making to additional hardware resources, and forward the packets in response to outsourced decisions. The PPE may be provided in a lookup subsystem (LUSS) block of the network device. The LUSS block may be controlled by a common driver architecture (CDA)-LUSS daemon that receives messages (e.g., inter-process communication (IPC) messages) whenever a bandwidth change occurs for the routing component.

The WAN interface is a type of specialized network interface that allows the network device to connect to and transmit data over a WAN. The WAN interface may support WAN technologies (e.g., gigabit Ethernet), voice technologies, data applications, voice applications, voice and data applications, and/or the like, depending on the capabilities of the network device.

The MQSS block includes a system that enqueues data into a memory (e.g., the HBM) of the network device. The MQSS block may utilize a grant rate limit to control a quantity of data enqueued into the memory. The MQSS block may utilize a node shaping rate to control a quantity of data enqueued into the memory. The network device may program the MQSS block directly whenever a bandwidth change occurs for the routing component.

The ASIC is an integrated circuit (IC) chip customized for a particular use, rather than intended for general-purpose use. The ASIC may include non-standard integrated circuits that have been designed for a specific use or application. For example, the ASIC may be designed to control the LUSS block for performing lookups, to control the MQSS block for enqueuing the memory, and to control a rich quality of service (QoS) block lookup for performing QoS lookups. The ASIC may include non-standard integrated circuits that have been designed for a specific use or application.

The HBM is a high-speed computer memory interface for three-dimensional stacked synchronous dynamic random-access memory (SDRAM). The HBM may be used in conjunction with high-performance graphics accelerators, network devices, some supercomputers, and/or the like. The HBM may achieve a higher bandwidth while using less power in a substantially smaller form factor than other memories.

The ASIC temperature sensor is an electronic device that measures a temperature of the ASIC and converts the measured temperature into electronic data to record, monitor, or signal temperature changes of the ASIC. The ASIC temperature sensor may be in direct contact with the ASIC (e.g., embedded within the ASIC) or may indirectly measure the temperature of the ASIC (a non-contact temperature sensor).

The HBM temperature sensor is an electronic device that measures a temperature of the HBM and converts the measured temperature into electronic data to record, monitor, or signal temperature changes of the HBM. The HBM temperature sensor may be in direct contact with the HBM (e.g., embedded within the HBM) or may indirectly measure the temperature of the HBM (a non-contact temperature sensor).

In some implementations, the temperatures of the ASIC and the HBM may increase due to the functions of the ASIC and the HBM. For example, the ASIC temperature increase may be caused by an increase in packet traffic processed by the routing component. The HBM temperature increase may be caused by a high rate of data being written to the HBM, even in cases where packets are dropped. The quickly increasing temperatures of the ASIC and the HBM cause a worst-case alarm condition first in the network device. When the worst-case alarm condition occurs, the line card may be disabled due to an environmental policy of the network device. This may prevent the network device from complying with the NEBS standard.

In some implementations, and to comply with the NEBS standard, the network device may throttle processing of traffic in order to limit the temperatures of the ASIC and the HBM to maximum short-term temperature values (e.g., 120 degrees Celsius for the ASIC and 105 degrees Celsius for the HBM), as described elsewhere herein. For example, the network device may operate at worst-case conditions for compliance with the NEBS standard, such as at ambient temperatures up to sixty-one degrees Celsius at sea level, five hundred gigabits per second (Gbps) of traffic per routing component, and two hundred billion packets per routing component (e.g., worst-case test conditions). For such worst-case conditions, the ASIC and the HBM of the routing component may be prevented from exceeding the maximum short-term temperature values, which may result in a line card of the routing component being disabled.

Figure 1B:
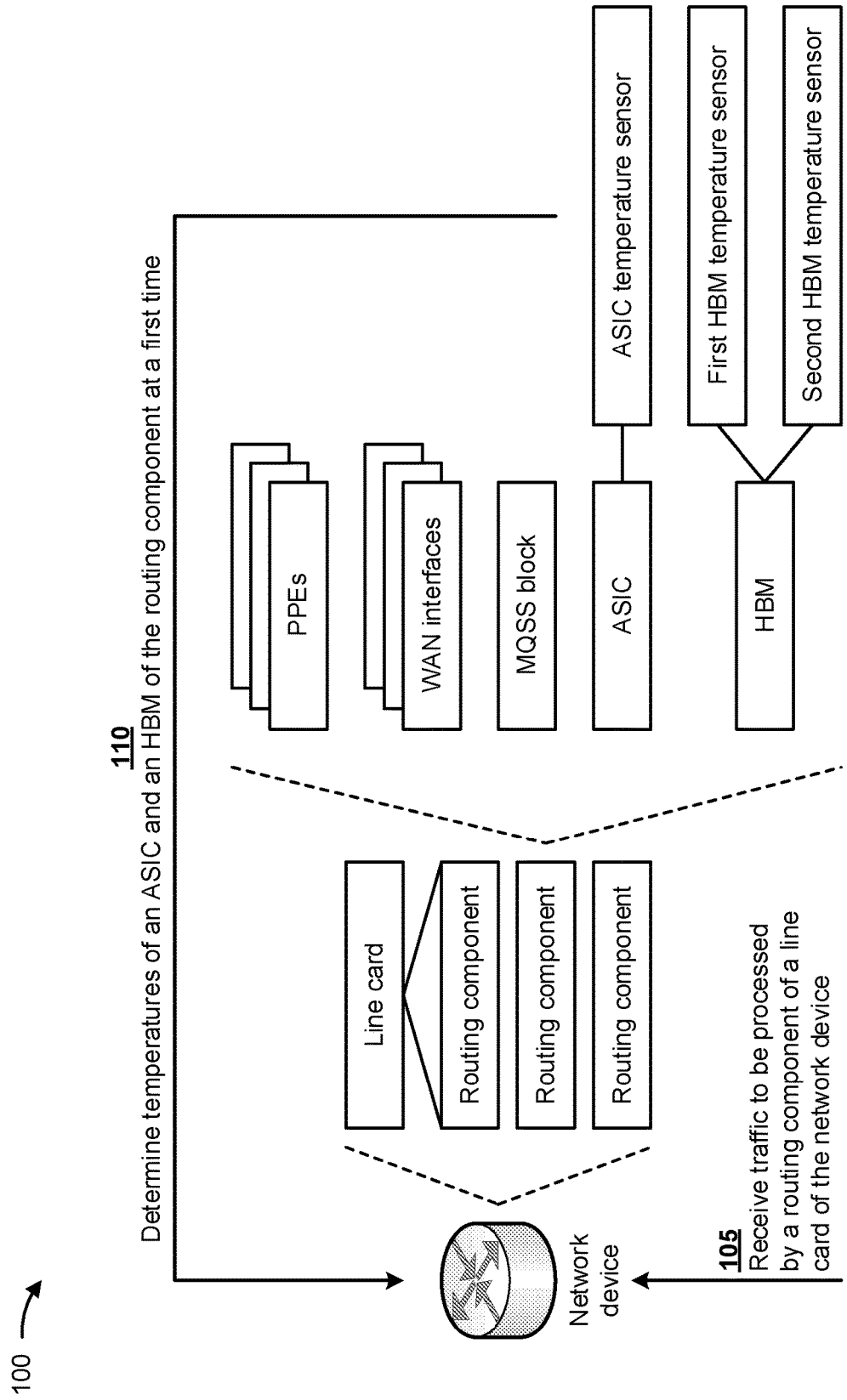

As shown in FIG. 1B, and by reference number 105, the network device may receive traffic to be processed by a routing component of a line card of the network device. The traffic may include one or more packets received from one or more other network devices, from one or more endpoint devices of the network, and/or from one or more other resources of the network. In some implementations, one of the routing components of the line card may process the traffic to encapsulate the one or more packets of the traffic, forward the traffic to one or more destinations, and/or the like.

As further shown in FIG. 1B, and by reference number 110, the network device may determine temperatures of an ASIC and an HBM of the routing component at a first time. In some implementations, the network device receives a sensor reading from the ASIC temperature sensor at the first time, and determines the temperature of the ASIC based on the sensor reading. In some implementations, the network device receives a first sensor reading from the first HBM temperature sensor at the first time, receives a second sensor reading from the second HBM temperature sensor at the first time, and determines the temperature of the HBM based on the first sensor reading and the second sensor reading. In such instances, the network device may determine the temperature of the HBM based on an average, a mean, and/or the like, of the first sensor reading and the second sensor reading. Although implementations are described herein in connection with a single routing component of the network device, the implementations may be applied to all of the routing components of the network device. For example, the network device may determine temperatures of ASICs and HBMs of each of the routing components at the first time. The first time may be based on a time period, such as every ten seconds, twenty seconds, thirty seconds, and/or the like.

Figure 1C:
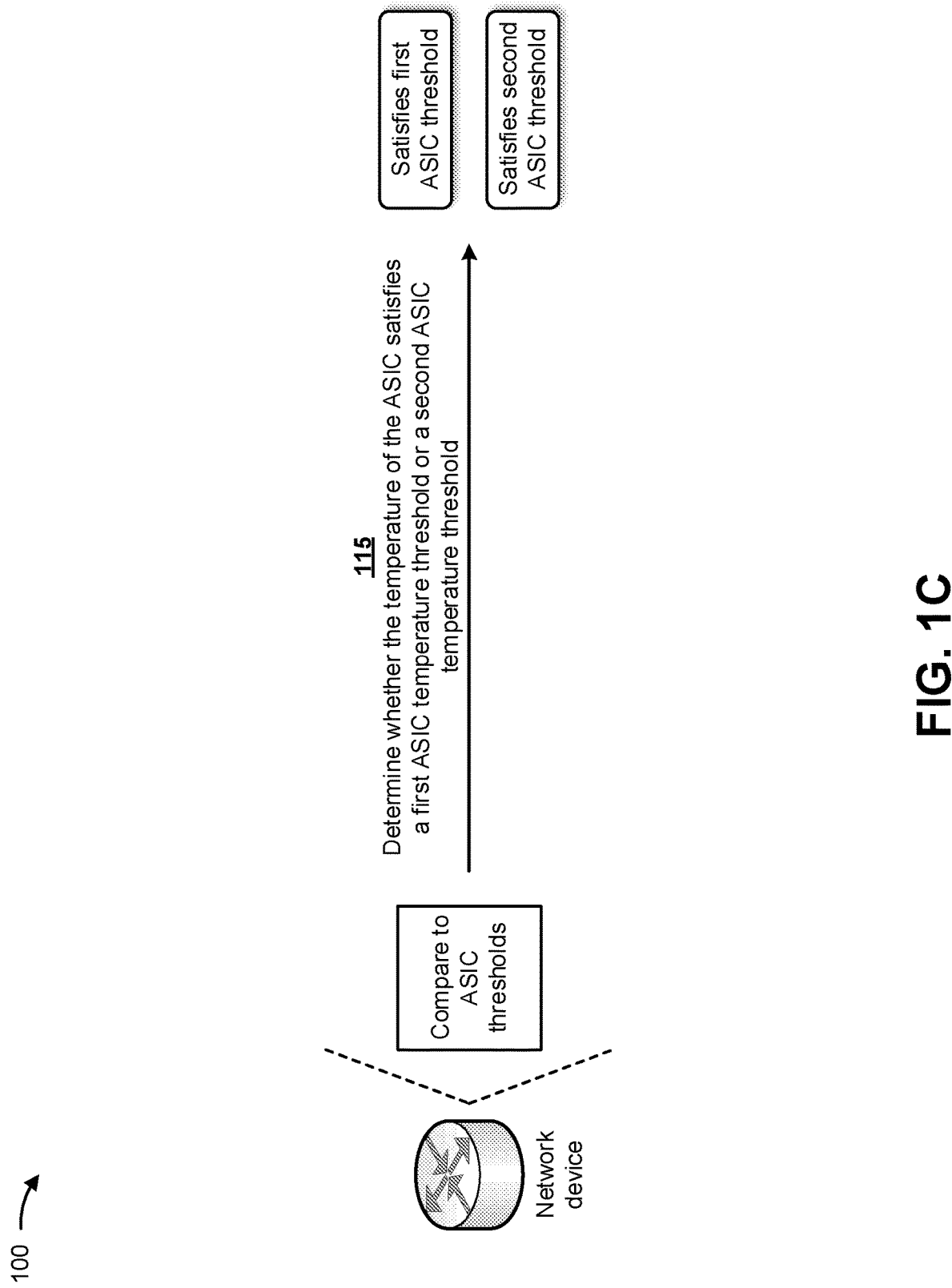

As shown in FIG. 1C, and by reference number 115, the network device may determine whether the temperature of the ASIC satisfies a first ASIC temperature threshold or a second ASIC temperature threshold. In some implementations, the first ASIC temperature threshold is satisfied when the temperature of the ASIC is greater than or equal to a maximum short-term temperature value (e.g., 120 degrees Celsius) of the ASIC. In some implementations, the second ASIC temperature threshold is satisfied when the temperature of the ASIC is greater than or equal to a value (e.g., 122 degrees Celsius) higher than the maximum short-term temperature of the ASIC. The first ASIC temperature threshold and/or the second ASIC temperature threshold may be modified (e.g., based on user input) to values other than the values described above.

Figure 1D:
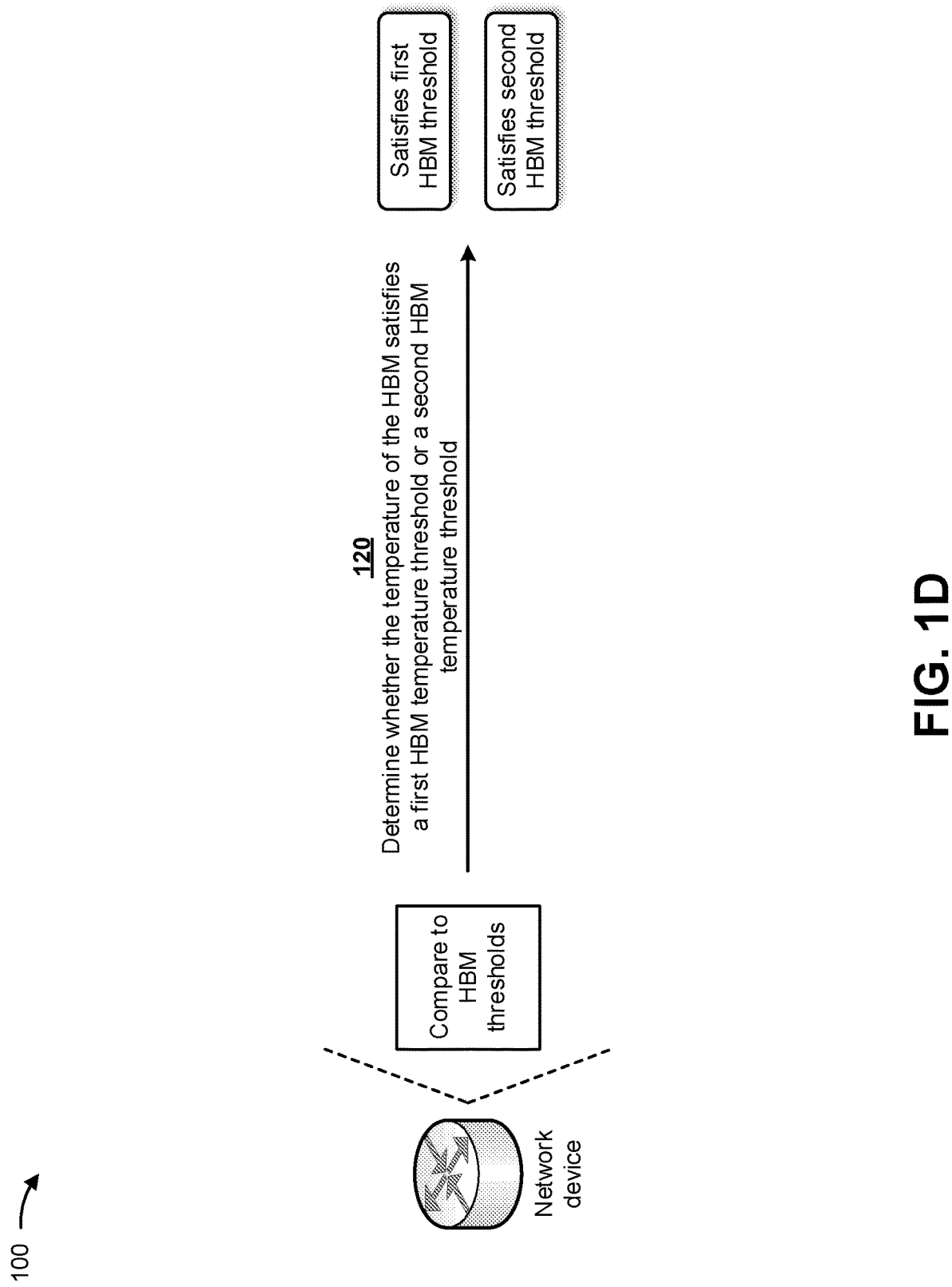

As shown in FIG. 1D, and by reference number 120, the network device may determine whether the temperature of the HBM satisfies a first HBM temperature threshold or a second HBM temperature threshold. In some implementations, the first HBM temperature threshold is satisfied when the temperature of the HBM is greater than or equal to a maximum short-term temperature value (e.g., 105 degrees Celsius) of the HBM. In some implementations, the second HBM temperature threshold is satisfied when the temperature of the HBM is greater than or equal to a value (e.g., 107 degrees Celsius) higher than the maximum short-term temperature of the HBM. The first HBM temperature threshold and/or the second HBM temperature threshold may be modified (e.g., based on user input) to values other than the values described above.

Figure 1E:
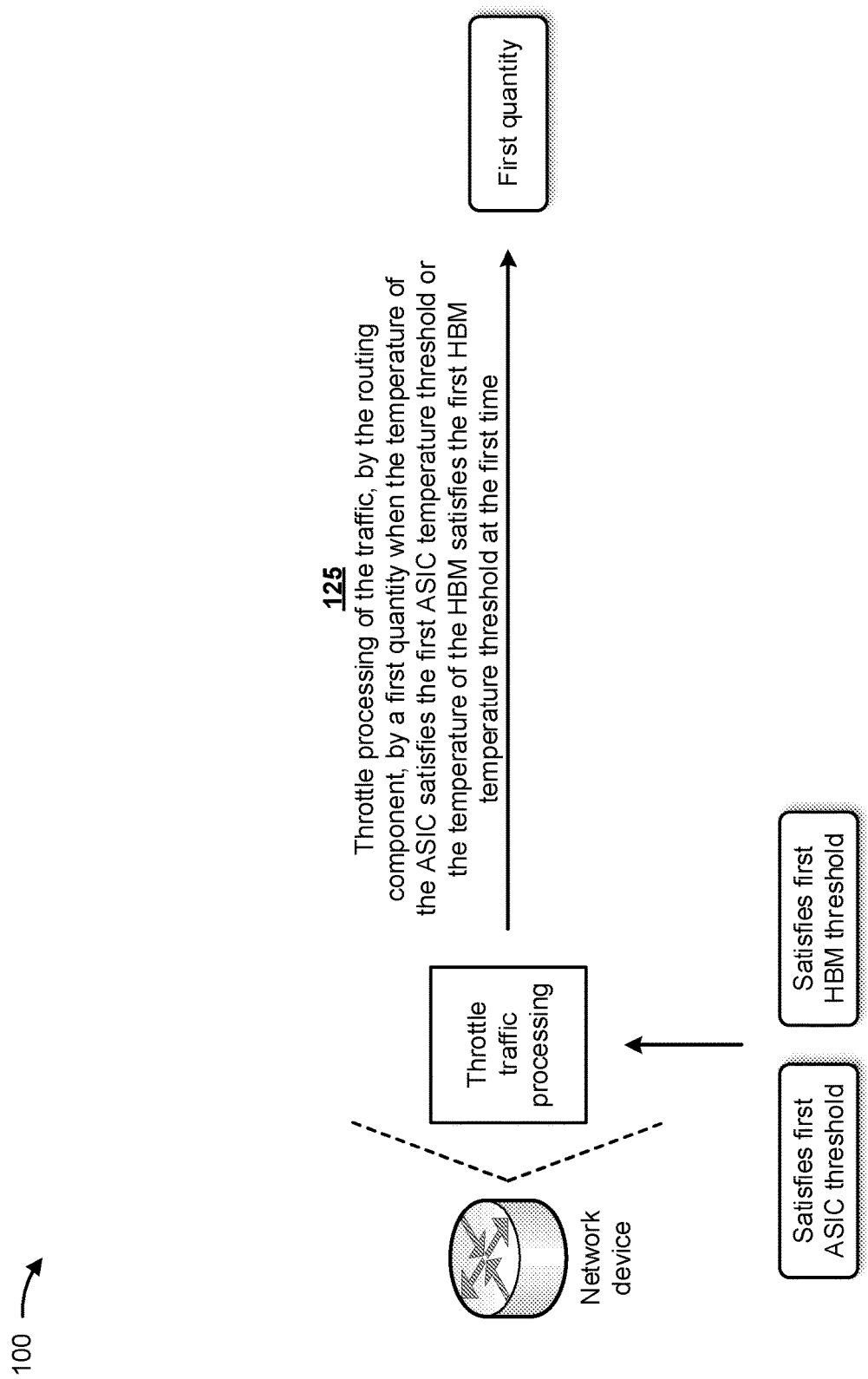

As shown in FIG. 1E, and by reference number 125, the network device may throttle processing of the traffic, by the routing component, by a first quantity when the temperature of the ASIC satisfies the first ASIC temperature threshold or the temperature of the HBM satisfies the first HBM temperature threshold at the first time. For example, the network device may throttle (e.g., decrease) the processing of the traffic, by the routing component, by the first quantity when the temperature of the ASIC is greater than or equal to the maximum short-term temperature value (e.g., 120 degrees Celsius) of the ASIC, or the temperature of the HBM (e.g., provided by both HBM temperature sensors) is greater than or equal to the maximum short-term temperature value (e.g., 105 degrees Celsius) of the HBM. In some implementations, the first quantity includes a percentage value (e.g., five percent, ten percent, fifteen percent, and/or the like) to throttle the processing of the traffic by the routing component. For example, in the worst-case test conditions, a first quantity of ten percent may result in the routing component processing fifty Gbps less of the five hundred Gbps (e.g., processing four-hundred and fifty Gbps). In this way, the network device may reduce the processing by the routing component, which may reduce processing by the ASIC and the HBM of the routing component and reduce the temperatures of the ASIC and the HBM. Although implementations describe throttling by fifty Gbps, traffic may be throttled relative to the maximum rate that the ASIC may support and not by an absolute increment of fifty Gbps.

Figure 1F:
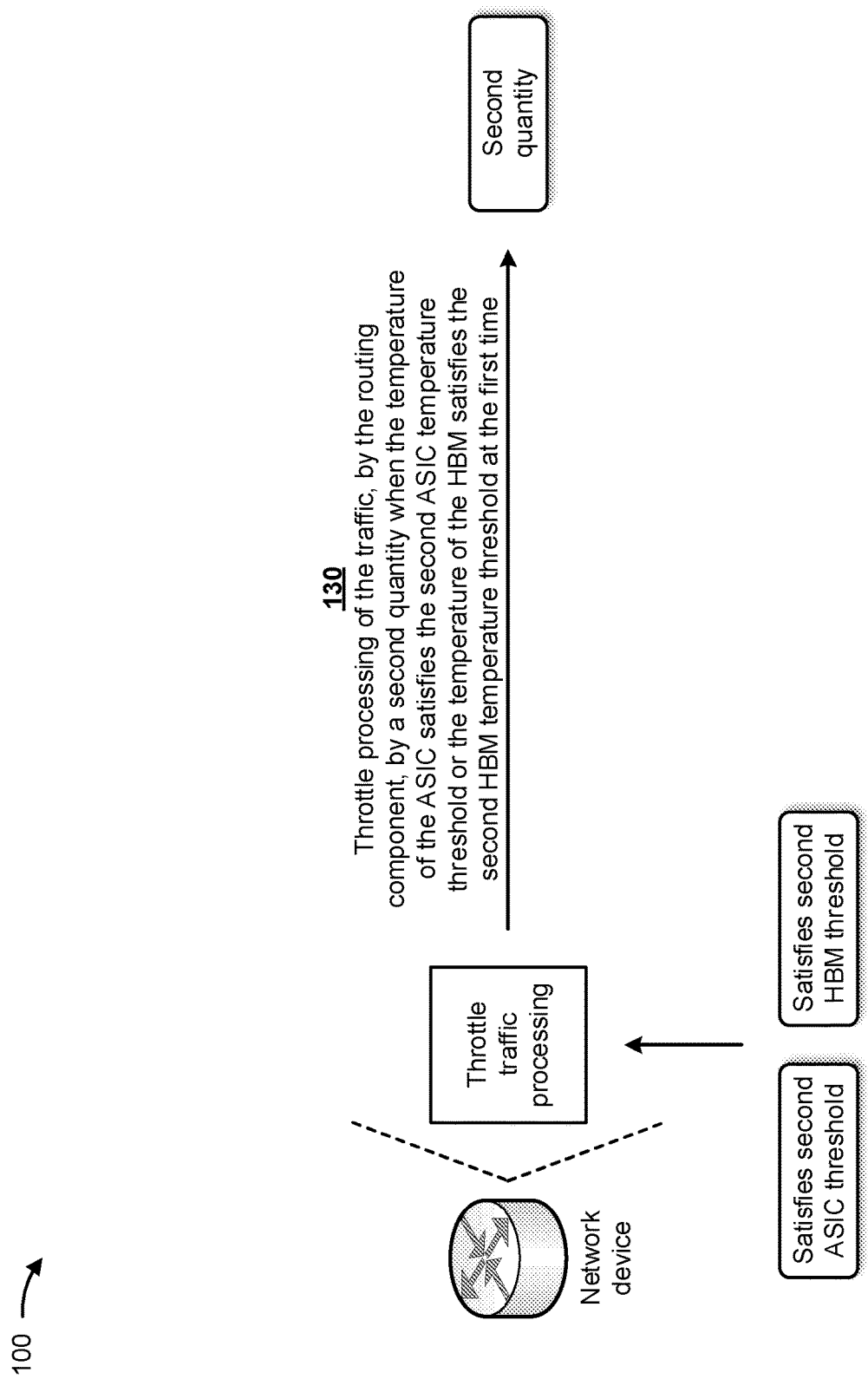

As shown in FIG. 1F, and by reference number 130, the network device may throttle the processing of the traffic, by the routing component, by a second quantity when the temperature of the ASIC satisfies the second ASIC temperature threshold or the temperature of the HBM satisfies the second HBM temperature threshold at the first time. For example, the network device may throttle (e.g., decrease) the processing of the traffic, by the routing component, by the second quantity when the temperature of the ASIC is greater than or equal to the value (e.g., 122 degrees Celsius) that is more than the maximum short-term temperature of the ASIC or the temperature of the HBM (e.g., provided by both HBM temperature sensors) is greater than or equal to the value (e.g., 107 degrees Celsius) that is more than the maximum short-term temperature of the HBM.

In some implementations, the second quantity includes a percentage value (e.g., five percent, ten percent, fifteen percent, and/or the like) to throttle the processing of the traffic by the routing component. In some implementations, the second quantity is greater than the first quantity to more quickly reduce the temperatures of the ASIC and the HBM. For example, in the worst-case test conditions, a second quantity of twenty percent may result in the routing component processing one hundred Gbps less of the five hundred Gbps (e.g., processing four-hundred Gbps). In this way, the network device may reduce the processing by the routing component by more than the first quantity, which may further reduce the processing by the ASIC and the HBM of the routing component and more quickly reduce the temperatures of the ASIC and the HBM.

Figure 1G:
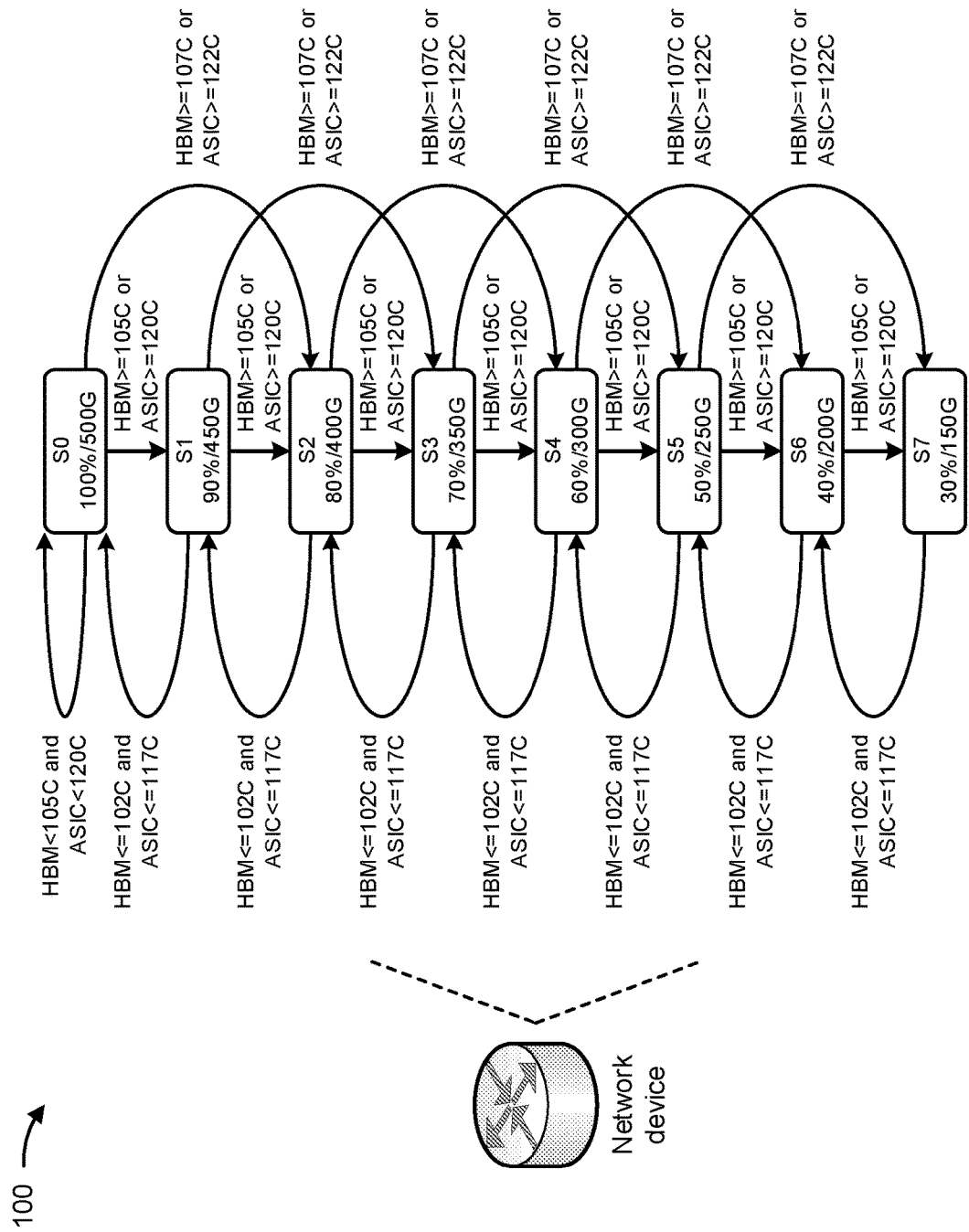

As shown in FIG. 1G, the network device may utilize a state machine for controlling (e.g., throttling) the processing of the traffic by the routing component. In some implementations, the network device utilizes a separate state machine for each of the routing components of the network device. As shown, the state machine may include multiple states (e.g., an initial state (S0), a first state (S1), and/or the like) associated with the processing of the traffic by the routing component. At the initial state (S0), the routing component may process 100% of the traffic or five hundred (500) Gbps. When any of the temperatures measured by the ASIC temperature sensor, the first HBM temperature sensor, or the second HBM temperature sensor are greater than or equal to a next-state threshold (e.g., 105 degrees Celsius for the HBM or 120 degrees Celsius for the ASIC), the state machine may increase throttling by one state. For example, if the temperature of the HBM is greater than 105 degrees Celsius or the temperature of the ASIC is greater than 120 degrees Celsius, the state machine may move from the initial state to the first state. The first state may cause the network device to reduce the processing of the traffic, by the routing component, to 90% or four-hundred and fifty (450) Gbps. If the temperature of the HBM remains greater than 105 degrees Celsius or the temperature of the ASIC remains greater than 120 degrees Celsius for a first threshold quantity of time, the state machine may move from the first state to the second state. The second state may cause the network device to reduce the processing of the traffic, by the routing component, by a percentage (e.g., to 80% or four-hundred (400) Gbps). This process may continue until the temperature of the HBM is not greater than or equal to 105 degrees Celsius and the temperature of the ASIC is not greater than or equal to 120 degrees Celsius.

As further shown in FIG. 1G, when any of the temperatures measured by the ASIC temperature sensor, the first HBM temperature sensor, or the second HBM temperature sensor are greater than or equal to a higher threshold (e.g., the 107 degrees Celsius for the HBM or 122 degrees Celsius for the ASIC), the state machine may increase throttling by two state levels. For example, if the temperature of the HBM is greater than 107 degrees Celsius or the temperature of the ASIC is greater than 122 degrees Celsius, the state machine may move from the second state to a third state. The third state may cause the network device to reduce the processing of the traffic, by the routing component, to 70% or three-hundred and fifty (350) Gbps. If the temperature of the HBM remains greater than 107 degrees Celsius or the temperature of the ASIC remains greater than 122 degrees Celsius, the state machine may move from the second state to the fourth state. The fourth state may cause the network device to reduce the processing of the traffic, by the routing component, to 60% or three-hundred (300) Gbps. This process may continue until the temperature of the HBM is not greater than or equal to 107 degrees Celsius and the temperature of the ASIC is not greater than or equal to 122 degrees Celsius. In this way, the network device may more quickly decrease processing by the ASIC and the HBM, which may more quickly reduce the temperatures of the ASIC and the HBM. In some implementations, the network device may utilize hysteresis to minimize jittering between the states. Hysteresis may include the network device providing a dynamic lag from one state to another state.

As further shown in FIG. 1G, when the temperatures measured by the ASIC temperature sensor, the first HBM temperature sensor, and the second HBM temperature sensor are less than a particular threshold (e.g., 102 degrees Celsius for the HBM and 117 degrees Celsius for the ASIC), the state machine may decrease throttling by one state. For example, if the state machine is in the fourth state, the temperature of the HBM is less than 102 degrees Celsius, and the temperature of the ASIC is less than 117 degrees Celsius, the state machine may move from the fourth state to the third state. The third state may cause the network device to increase the processing of the traffic, by the routing component, to 70% or three-hundred and fifty (350) Gbps. This process may continue until the network device reaches the initial state.

Figure 1H:
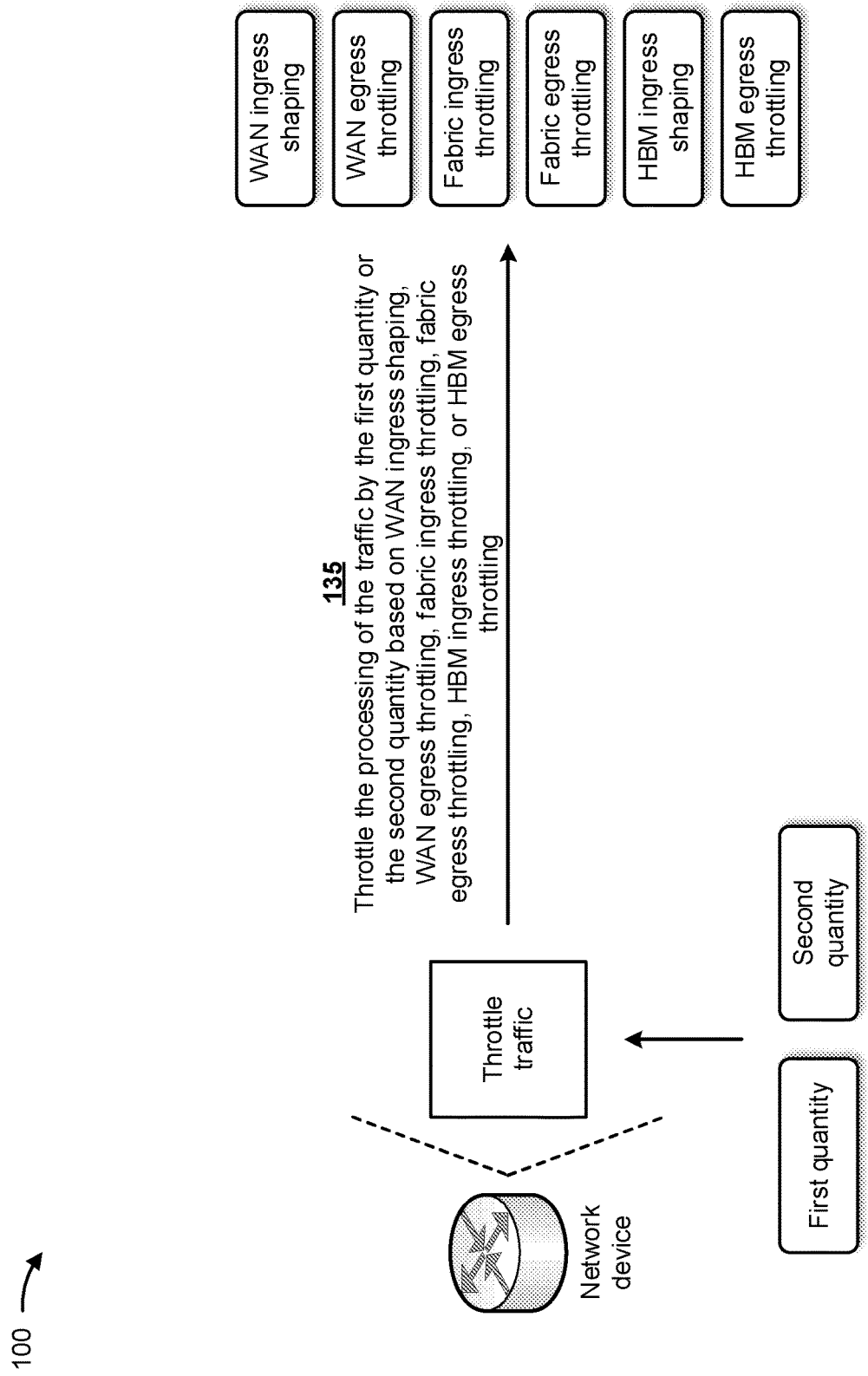

As shown in FIG. 1H, and by reference number 135, the network device may throttle the processing of the traffic by the first quantity or the second quantity based on WAN ingress shaping, WAN egress throttling, fabric ingress throttling, fabric egress throttling, HBM ingress throttling, HBM egress throttling, and/or the like. In some implementations, the network device throttles the processing of the traffic by utilizing one or more of the WAN ingress shaping, the WAN egress throttling, the fabric ingress throttling, the fabric egress throttling, the HBM ingress throttling, and the HBM egress throttling. Alternatively, the network device may throttle the processing of the traffic based only on the HBM ingress throttling and the HBM egress throttling, if the HBM ingress throttling and the HBM egress throttling are sufficient to throttle the processing of the traffic by the first quantity or the second quantity.

The network device may perform the WAN ingress shaping by disabling and enabling the PPE provided in the LUSS block. The LUSS block may be controlled by the CDA-LUSS daemon that receives messages (e.g., IPC messages) whenever a bandwidth change occurs for the routing component. An IPC message may include an index associated with the routing component and a bandwidth percentage associated with traffic throttling by the routing component. The CDA-LUSS may update the PPE based on the bandwidth percentage (e.g., a 10% bandwidth decrease).

The network device may perform the WAN egress throttling by adjusting Layer 1 node shaping rates on all of the WAN interfaces hosted in the routing component. The network device may provide, to a forwarding technical manager daemon, an IPC message indicating a bandwidth change for the routing component. The IPC message may include an index associated with the routing component and a bandwidth percentage associated with traffic throttling by the routing component. The forwarding technical manager daemon may adjust a shaping rate of the routing component based on the bandwidth percentage. The shaping rate may also be configured by a user of the network device.

The network device may perform the fabric ingress throttling by configuring a fabric Layer 1 shaping rate of the MQSS block. Since the network device controls the MQSS block, the network device may program the MQSS block directly whenever a bandwidth update is needed for the routing component. The fabric Layer 1 shaping rate may be configured based on a quantity of currently active fabric planes. Thus, the shaping rate may be set to a minimum of the shaping rate based on the quantity of the fabric planes and a temperature throttling rate.

The network device may perform the fabric egress throttling by configuring a grant rate limit of the MQSS block. Since the network device controls the MQSS block, the network device may program the MQSS block directly whenever a bandwidth update is needed for the routing component.

The network device may perform the HBM ingress throttling by throttling writes (e.g., writing of data) to the HBM, and may perform the HBM egress throttling by throttling reads (e.g., reading of data) from the HBM.

Figure 1I:
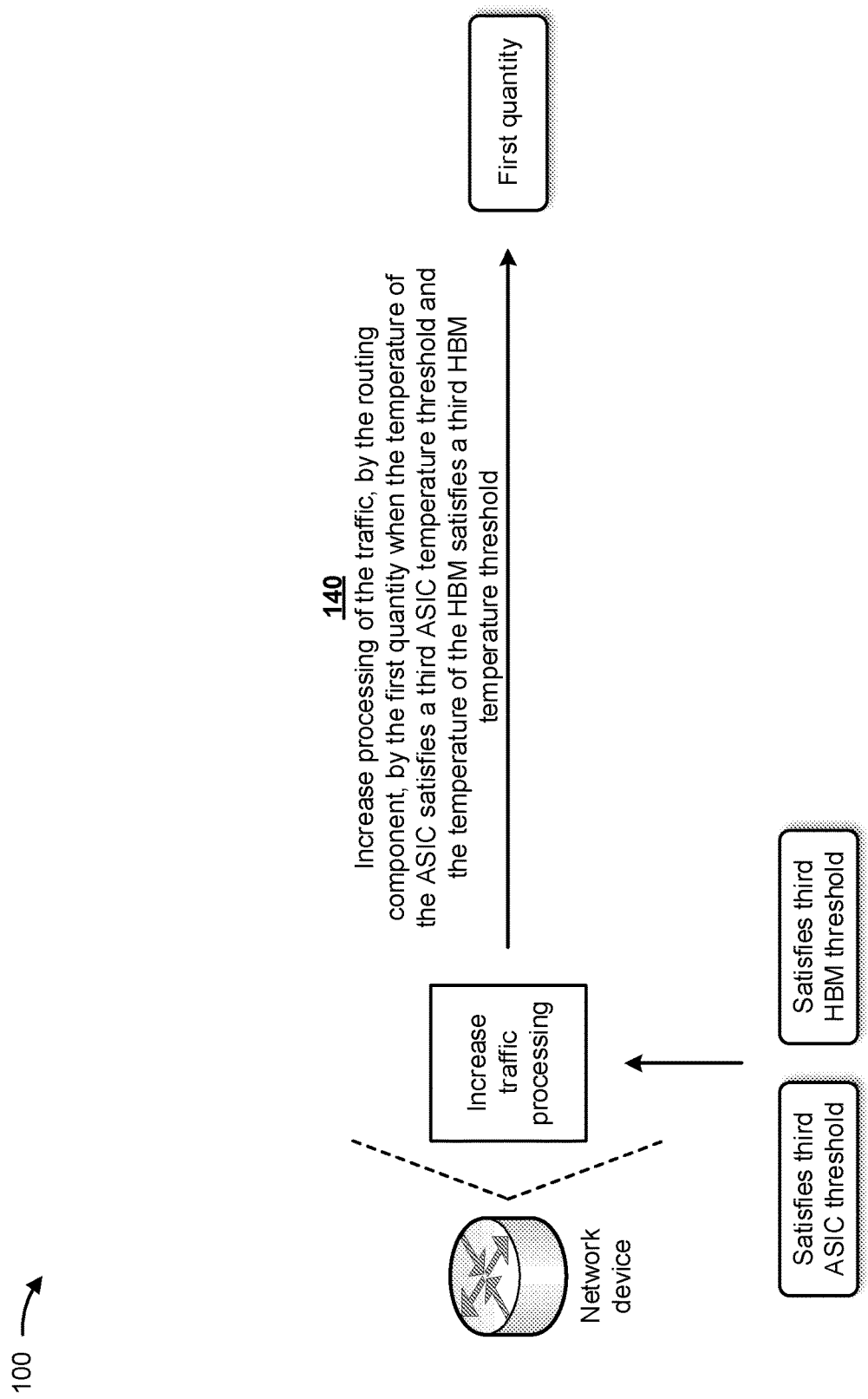

As shown in FIG. 1I, and by reference number 140, the network device may increase the processing of the traffic, by the routing component, by the first quantity when the temperature of the ASIC satisfies a third ASIC temperature threshold and the temperature of the HBM satisfies a third HBM temperature threshold. For example, if the throttling of the processing of the traffic causes the temperatures of the ASIC and the HBM to be reduced, the network device may begin to reduce the throttling (e.g., decrease the throttling by one state, as described above in connection with FIG. 1G). Returning to the example of FIG. 1G, if the state machine is in the fourth state, the temperature of the HBM is less than 102 degrees Celsius, and the temperature of the ASIC is less than 117 degrees Celsius, the state machine may move from the fourth state to the third state. The third state may cause the network device to increase the processing of the traffic, by the routing component, from 60% to 70% or three-hundred and fifty (350) Gbps. In some implementations, the third ASIC temperature threshold is satisfied when the temperature of the ASIC is less than a particular threshold (e.g., 117 degrees Celsius). In some implementations, the third HBM temperature threshold is satisfied when the temperature of the HBM is less than a particular threshold (e.g., 102 degrees Celsius). The third ASIC temperature threshold and/or the third HBM temperature threshold may be modified (e.g., based on user input) to values other than the values described above.

Figure 1J:
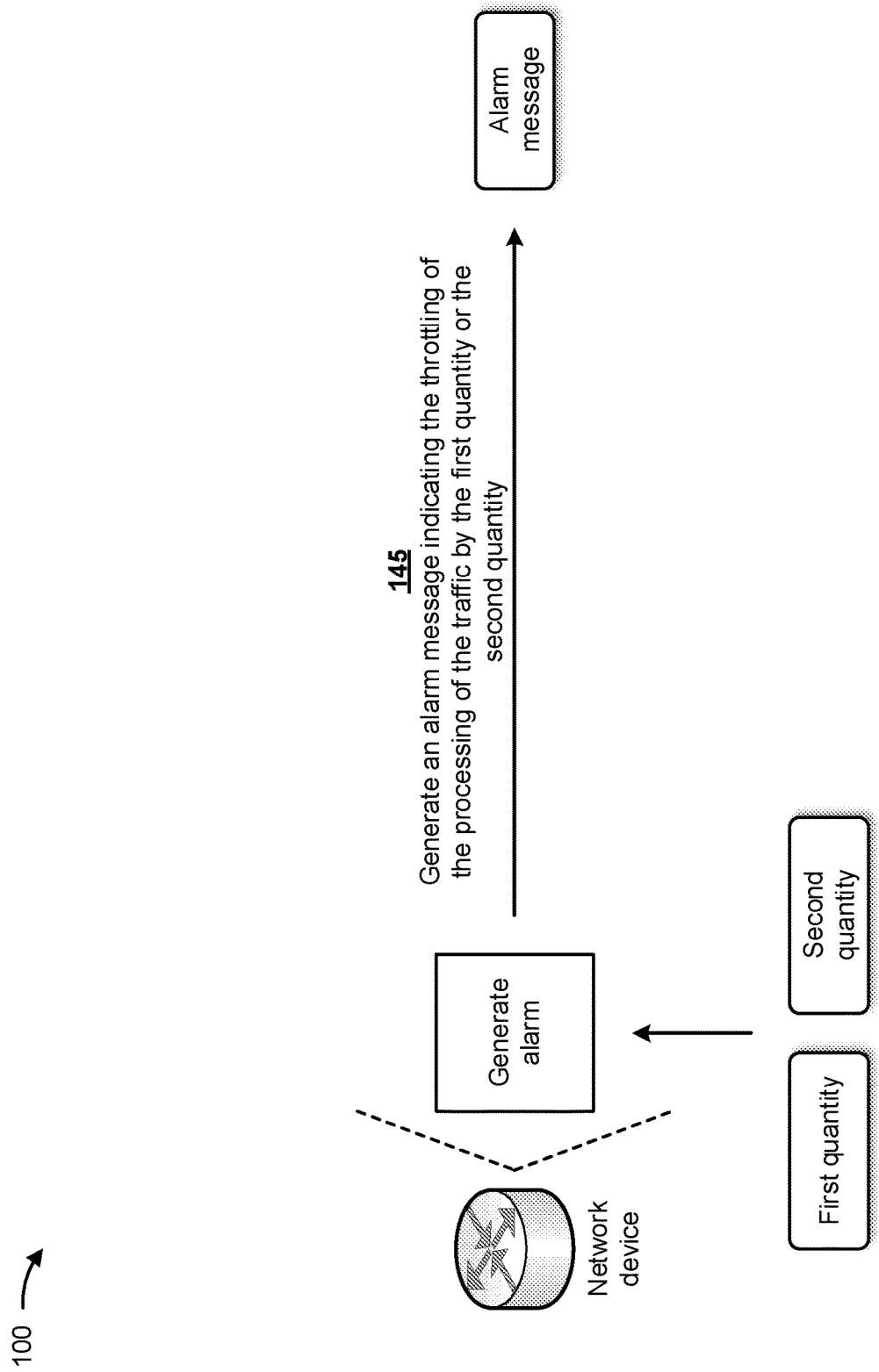

As shown in FIG. 1J, and by reference number 145, the network device may generate an alarm message indicating the throttling of the processing of the traffic by the first quantity or the second quantity. For example, each state transition (e.g., associated with throttling of the processing of the traffic) may cause the network device to generate a new alarm message. Whenever a state change occurs, the network device may clear a previously generated alarm message and may generate the new alarm message. The alarm message may include data identifying the routing component being throttled, a bandwidth quantity that is throttled, a current state, a previous state, and/or the like. The following provide example alarm messages that may be generated by the network device.

[Aug 2 17:24:53.227 LOG: Info] ASIC Temp Monitor: ZT0 state transition S0→S1

[Aug 2 17:24:53.227 LOG: Info] ASIC Temp Monitor: setting ZT0 BW 90%

[Aug 2 17:24:53.361 LOG: Notice] Error: /fpc 0/pfe/0/cm/0/ZT[0:0]/0/ZTCHIP_CMERROR_TEMP_MONITOR (0x36044c), scope: pfe, category: functional, severity: minor, module: ZT[0:0], type: BW THROTTLED: ZT Temperature monitor throttled bandwidth

[Aug 2 17:24:53.361 LOG: Notice] Performing action log for error fpc 0/pfe/0/cm/0/ZT[0:0]/0/ZTCHIP_CMERROR_TEMP_MONITOR (0x36044c) in module: ZT[0:0] with scope: pfe category: functional level: minor

[Aug 2 17:24:53.361 LOG: Notice] Performing action cmalarm for error fpc/0/pfe/0/cm/0/ZT[0:0]/0/ZTCHIP_CMERROR_TEMP_MONITOR (0x36044c) in module: ZT[0:0] with scope: pfe category: functional level: minor

[Aug 2 17:24:53.361 LOG: Err] Cmerror Op Set: ZT[0:0]: Temperature monitor throttled BW 90% regress@ferrari02> show chassis errors active detail

Slot 0

Location: FPC 0

Identifier: /fpc/0/pfe/0/cm/0/ZT[0:0]/0/ZTCHIP_CMERROR_TEMP_MONITOR

Error: ZTCHIP_CMERROR_TEMP_MONITOR

Scope: pfe

Category: functional

Severity: Minor

Details: TEMP_MONITOR: ZT Temperature monitor throttled bandwidth

Count: 1

Support: No help info provided

Location: FPC 0

Identifier: /fpc/0/pfe/0/cm/0/ZT[1:0]/1/ZTCHIP_CMERROR_TEMP_MONITOR

Error: ZTCHIP_CMERROR_TEMP_MONITOR

Scope: pfe

Category: functional

Severity: Minor

Details: TEMP_MONITOR: ZT Temperature monitor throttled bandwidth

Count: 1

Support: No help info provided regress@ferrari02> show chassis errors fpc-slot 0 error-id /fpc/0/pfe/0/cm/0/ZT[0:0]/0/ZTCHIP_CMERROR_TEMP_MONITOR
Slot 0
Error Name: ZTCHIP_CMERROR_TEMP_MONITOR
Identifier /fpc/0/pfe/0/cm/0/ZT[0:0]/0/ZTCHIP_CMERROR_TEMP_MONITOR
Description: TEMP_MONITOR: ZT Temperature monitor throttled bandwidth
State: enabled
Scope: pfe
Category: functional
PFE: 0
Configured Level: Minor
Default Level: Minor
Count: 1
Threshold: 1
Error Limit: 0
Occur Count: 1
Clear Count: 0
Last-occurred(ms ago): 138827

Figure 1K:
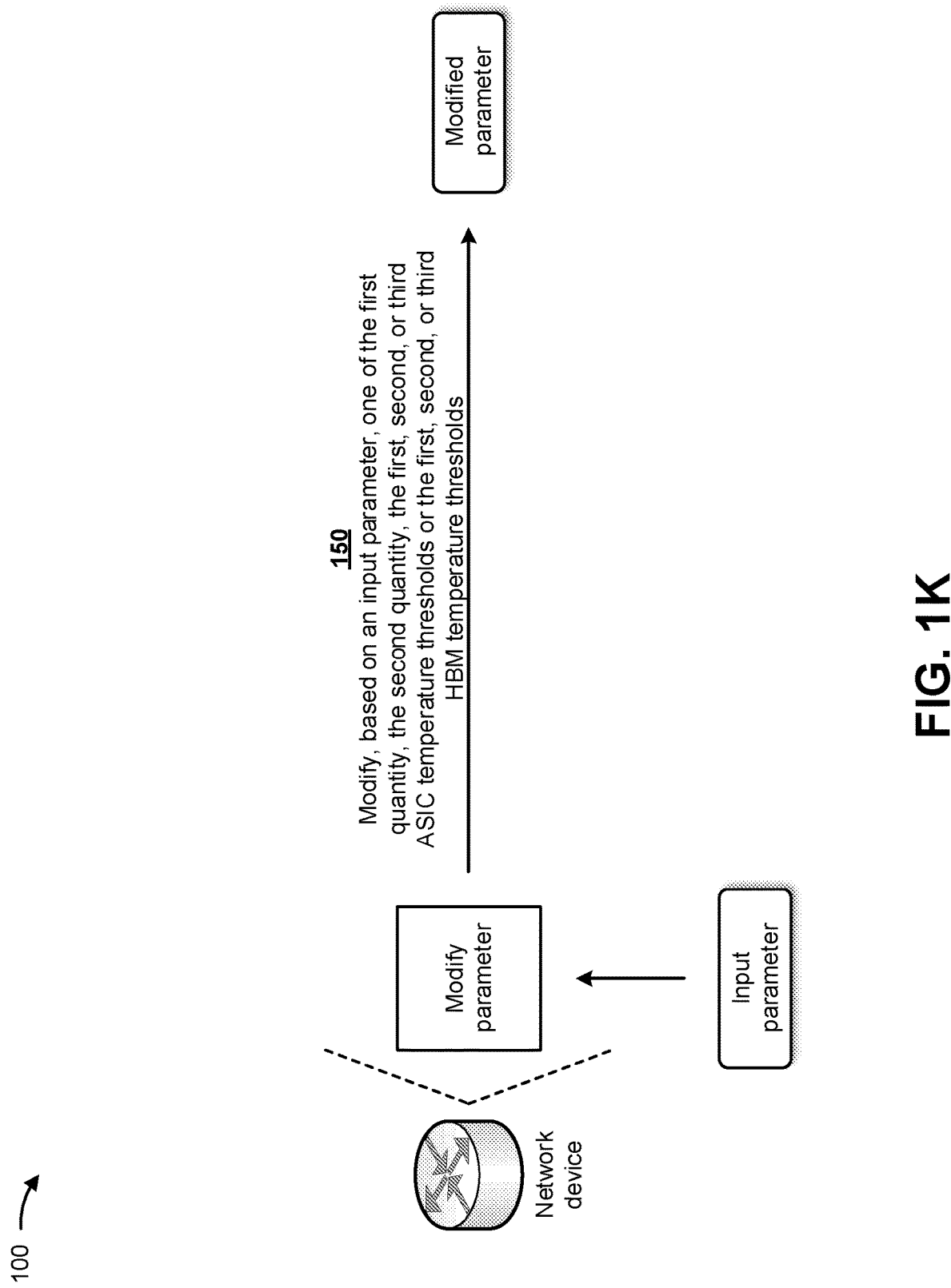

As shown in FIG. 1K, and by reference number 150, the network device may modify, based on an input parameter, one or more of the first quantity, the second quantity, the first ASIC temperature threshold, the second ASIC temperature threshold, the third ASIC temperature threshold, the first HBM temperature threshold, the second HBM temperature threshold, or the third HBM temperature threshold. For example, a user of the network device may modify one or more of the parameters utilized to throttle the processing of traffic by the routing components of the network device by providing input parameters to the network device. In some implementations, the input parameters may modify one or more of the above-mentioned parameters for one or more routing components of the network device but not for other routing components of the network device. In some implementations, the user may modify states in the state machine (e.g., to reduce or increase throttling percentages), may add one or more states to the state machine, and/or the like.

The following input parameters may be utilized to enable or disable throttling for the network device:
vty fpcX 0
test asic-temp-monitor enable
test asic-temp-monitor disable.

The following input parameters may be utilized to display temperature thresholds and bandwidth percentages for each state:
vty fpcX 0
show asic-temp-monitor thresholds
ZT Temperature Throttle Thresholds: lo,hi1,hi2
State S0 PFE BW 100%
ASIC: 120 C 120 C 122 C
HBM: 104 C 105 C 107 C
State S2 PFE BW 90%
ASIC: 117 C 120 C 122 C
HBM: 102 C 105 C 107 C
State S2 PFE BW 80%
ASIC: 117 C 120 C 122 C
HBM: 102 C 105 C 107 C
State S3 PFE BW 70%
ASIC: 117 C 120 C 122 C
HBM: 102 C 105 C 107 C
State S4 PFE BW 60%
ASIC: 117 C 120 C 122 C
HBM: 102 C 105 C 107 C
State S5 PFE BW 50%
ASIC: 117 C 120 C 122 C
HBM: 102 C 105 C 107 C
State S6 PFE BW 40%
ASIC: 117 C 120 C 122 C
HBM: 102 C 105 C 107 C
State S7 PFE BW 30%
ASIC: 117 C 120 C 122 C
HBM: 102 C 105 C 107 C The following input parameters may be utilized to display dynamic state machine information (e.g., current state, previous state, temperatures, bandwidth throttle information, and/or the like):
vty fpcX 0
show asic-temp-monitor state
ASIC Temperature Monitor: ENABLED
ZT0
Curr State: S0 (100% BW)
Prev State: S0 (100% BW)
ASIC temp: 77 C
HBM0 temp: 73 C
HBMJ temp: 73 C
ZTJ
Curr State: S0 (100% BW)
Prev State: S0 (100% BW)
ASIC temp: 85 C
HBM0 temp: 78 C
HBMJ temp: 79 C The following input parameters may be utilized to set the temperature thresholds for each state:
test asic-temp-monitor asic-thresholds <step num><lo thresh><hi1 thresh><hi2 thresh>
test asic-temp-monitor hbm-thresholds <step num><lo thresh><hi1 thresh><hi2 thresh>

The following input parameters may be utilized to display various bandwidth throttling configuration settings (e.g., MQSS rate limiting, PPE settings, shaping rate throttling, and/or the like):
vty fpcX.0
show mqss <pfe-idx> fi rate-limiter-table
show mqss <pfe-idx> sched-fab l1-node tick-table 0
vty fpcX
>test cda lkup-chip disp state pfeid<pfe-idx>
>show class-of-service interface scheduler brief
>show sandbox token <Node-Token>
>show cda xqss scheduler L1 node-index <l1-node><pfe-idx>

In this way, the network device may provide dynamic bandwidth throttling of the network device component for telecommunications standard compliance. For example, the network device may be designed to operate in a NEBS temperature environment (e.g., to comply with the NEBs standard). The network device need not utilize fewer routing engines per line card and does not require expensive heat sinks to dissipate heat. This, in turn, conserves computing resources, networking resources, and/or the like that would otherwise have been used in providing network devices with less capabilities (e.g., less routing engines), utilizing expensive and space consuming heat sinks, and/or the like.

As indicated above, FIGS. 1A-1K are provided as an example. Other examples may differ from what is described with regard to FIGS. 1A-1K. The number and arrangement of devices shown in FIGS. 1A-1K are provided as an example. In practice, there may be additional devices, fewer devices, different devices, or differently arranged devices than those shown in FIGS. 1A-1K. Furthermore, two or more devices shown in FIGS. 1A-1K may be implemented within a single device, or a single device shown in FIGS. 1A-1K may be implemented as multiple, distributed devices. Additionally, or alternatively, a set of devices (e.g., one or more devices) shown in FIGS. 1A-1K may perform one or more functions described as being performed by another set of devices shown in FIGS. 1A-1K.

Figure 2:
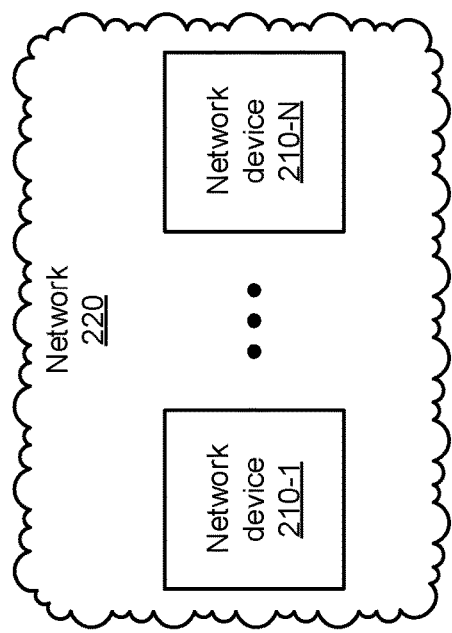
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a group of network devices 210 (shown as network device 210-1 through Network device 210-N) provided within a network 220. Devices of environment 200 may interconnect via wired connections, wireless connections, or a combination of wired and wireless connections.

Network device 210 includes one or more devices capable of receiving, processing, storing, routing, and/or providing traffic (e.g., a packet, other information or metadata, and/or the like) in a manner described herein. For example, network device 210 may include a router, such as a label switching router (LSR), a label edge router (LER), an ingress router, an egress router, a provider router (e.g., a provider edge router, a provider core router, and/or the like), a virtual router, and/or the like. Additionally, or alternatively, network device 210 may include a gateway, a switch, a firewall, a hub, a bridge, a reverse proxy, a server (e.g., a proxy server, a cloud server, a data center server, and/or the like), a load balancer, and/or a similar device. In some implementations, network device 210 may be a physical device implemented within a housing, such as a chassis. In some implementations, network device 210 may be a virtual device implemented by one or more computing devices of a cloud computing environment or a data center. In some implementations, a group of network devices 210 may be a group of data center nodes that are used to route traffic flow through a network.

Network 220 includes one or more wired and/or wireless networks. For example, network 220 may include a cellular network (e.g., a fifth generation (5G) network, a fourth generation (4G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks. Network 220 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
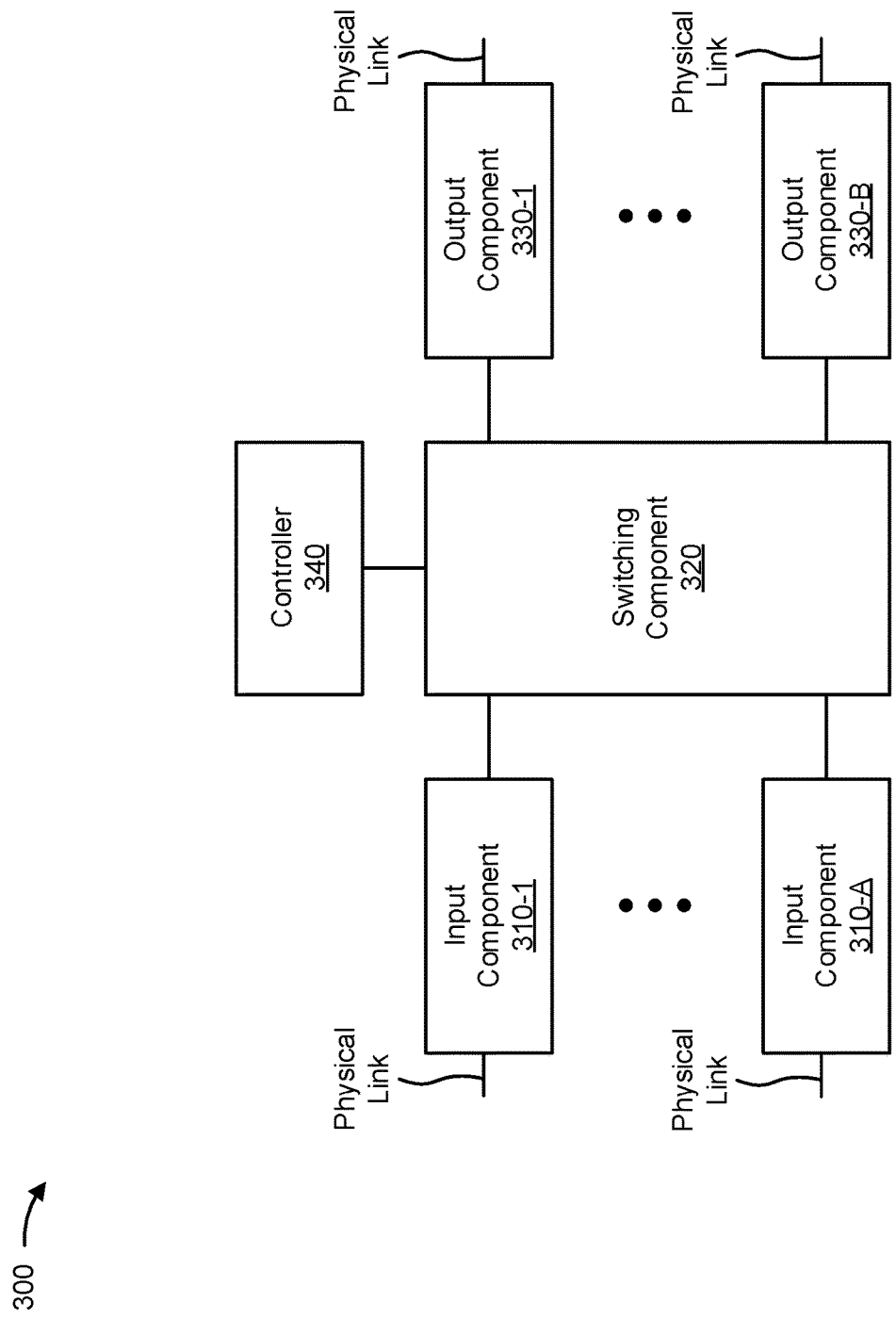
FIGS. 3 and 4 are diagrams of example components of one or more devices of FIG. 2.

FIG. 3 is a diagram of example components of a device 300. Device 300 may correspond to network device 210. In some implementations, network device 210 may include one or more devices 300 and/or one or more components of device 300. As shown in FIG. 3, device 300 may include one or more input components 310-1 through 310-B (B≥1) (hereinafter referred to collectively as input components 310, and individually as input component 310), a switching component 320, one or more output components 330-1 through 330-C (C≥1) (hereinafter referred to collectively as output components 330, and individually as output component 330), and a controller 340.

Input component 310 may be one or more points of attachment for physical links and may be one or more points of entry for incoming traffic, such as packets. Input component 310 may process incoming traffic, such as by performing data link layer encapsulation or decapsulation. In some implementations, input component 310 may transmit and/or receive packets. In some implementations, input component 310 may include an input line card that includes one or more packet processing components (e.g., in the form of integrated circuits), such as one or more interface cards (IFCs), packet forwarding components, line card controller components, input ports, processors, memories, and/or input queues. In some implementations, device 300 may include one or more input components 310.

Switching component 320 may interconnect input components 310 with output components 330. In some implementations, switching component 320 may be implemented via one or more crossbars, via busses, and/or with shared memories. The shared memories may act as temporary buffers to store packets from input components 310 before the packets are eventually scheduled for delivery to output components 330. In some implementations, switching component 320 may enable input components 310, output components 330, and/or controller 340 to communicate with one another.

Output component 330 may store packets and may schedule packets for transmission on output physical links. Output component 330 may support data link layer encapsulation or decapsulation, and/or a variety of higher-level protocols. In some implementations, output component 330 may transmit packets and/or receive packets. In some implementations, output component 330 may include an output line card that includes one or more packet processing components (e.g., in the form of integrated circuits), such as one or more IFCs, packet forwarding components, line card controller components, output ports, processors, memories, and/or output queues. In some implementations, device 300 may include one or more output components 330. In some implementations, input component 310 and output component 330 may be implemented by the same set of components (e.g., and input/output component may be a combination of input component 310 and output component 330).

Controller 340 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, controller 340 may include one or more processors that can be programmed to perform a function.

In some implementations, controller 340 may include a RAM, a ROM, and/or another type of dynamic or static storage device (e.g., a flash memory, a magnetic memory, an optical memory, etc.) that stores information and/or instructions for use by controller 340.

In some implementations, controller 340 may communicate with other devices, networks, and/or systems connected to device 300 to exchange information regarding network topology. Controller 340 may create routing tables based on the network topology information, may create forwarding tables based on the routing tables, and may forward the forwarding tables to input components 310 and/or output components 330. Input components 310 and/or output components 330 may use the forwarding tables to perform route lookups for incoming and/or outgoing packets.

Controller 340 may perform one or more processes described herein. Controller 340 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 340 from another computer-readable medium or from another device via a communication interface. When executed, software instructions stored in a memory and/or storage component associated with controller 340 may cause controller 340 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
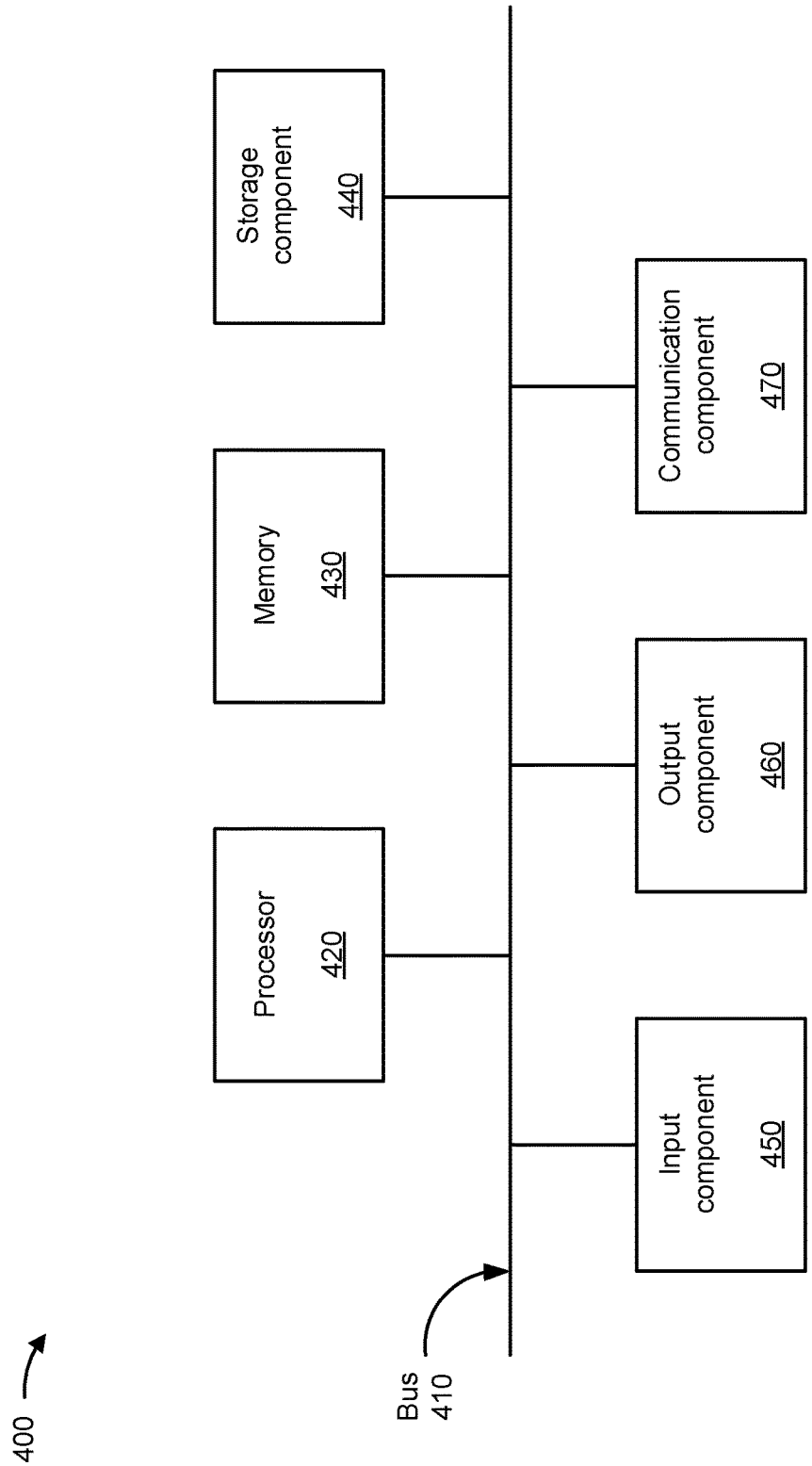

FIG. 4 is a diagram of example components of a device 400, which may correspond to network device 210. In some implementations, network device 210 may include one or more devices 400 and/or one or more components of device 400. As shown in FIG. 4, device 400 may include a bus 410, a processor 420, a memory 430, a storage component 440, an input component 450, an output component 460, and a communication component 470.

Bus 410 includes a component that enables wired and/or wireless communication among the components of device 400. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform a function. Memory 430 includes a random access memory), a read only memory, and/or another type of memory (e.g., a flash memory, a magnetic memory, and/or an optical memory).

Storage component 440 stores information and/or software related to the operation of device 400. For example, storage component 440 may include a hard disk drive, a magnetic disk drive, an optical disk drive, a solid state disk drive, a compact disc, a digital versatile disc, and/or another type of non-transitory computer-readable medium. Input component 450 enables device 400 to receive input, such as user input and/or sensed inputs. For example, input component 450 may include a touch screen, a keyboard, a keypad, a mouse, a button, a microphone, a switch, a sensor, a global positioning system component, an accelerometer, a gyroscope, an actuator, and/or the like. Output component 460 enables device 400 to provide output, such as via a display, a speaker, and/or one or more light-emitting diodes. Communication component 470 enables device 400 to communicate with other devices, such as via a wired connection and/or a wireless connection. For example, communication component 470 may include a receiver, a transmitter, a transceiver, a modem, a network interface card, an antenna, and/or the like.

Device 400 may perform one or more processes described herein. For example, a non-transitory computer-readable medium (e.g., memory 430 and/or storage component 440) may store a set of instructions (e.g., one or more instructions, code, software code, program code, and/or the like) for execution by processor 420. Processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
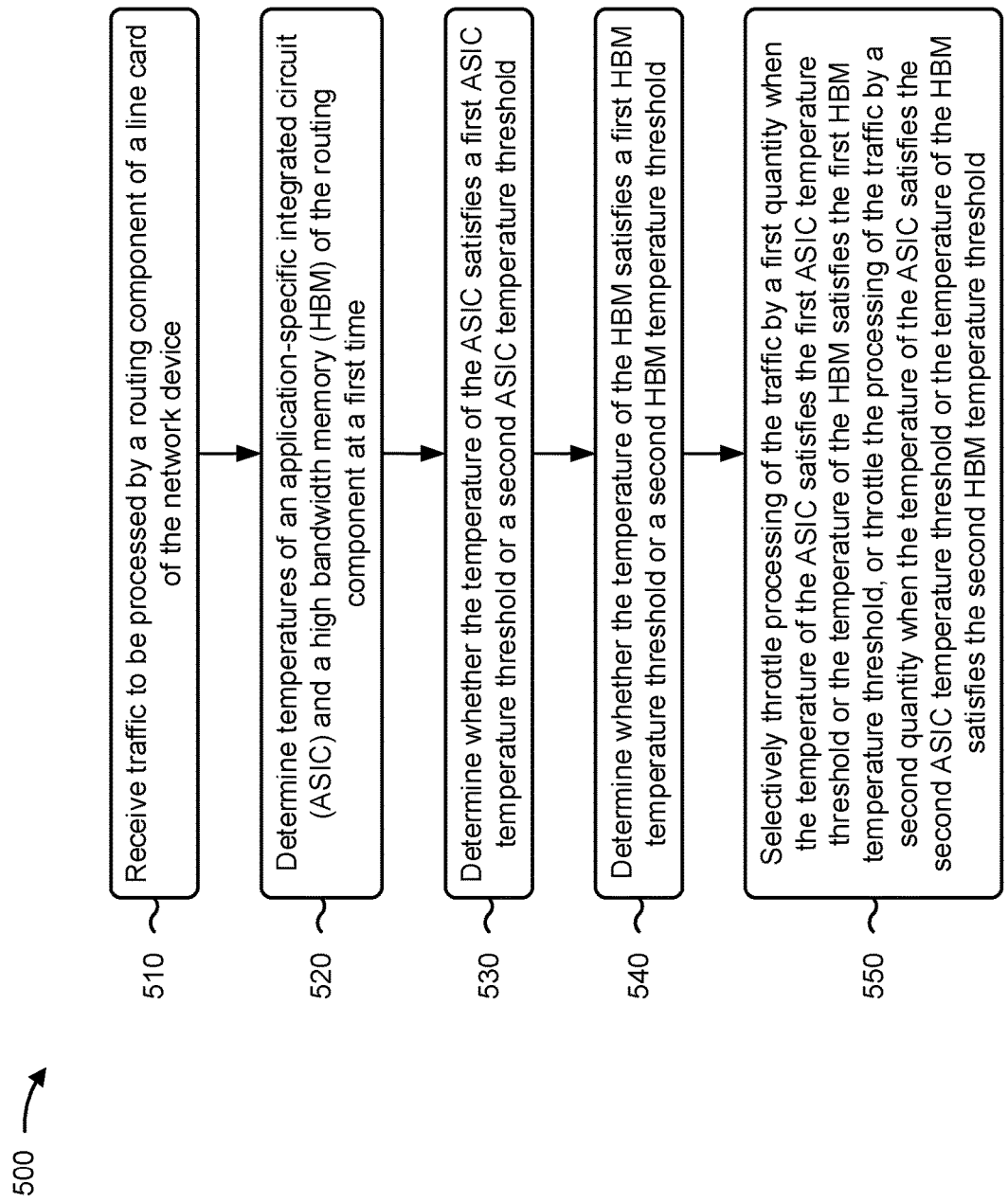
FIG. 5 is a flow chart of an example process associated with providing dynamic bandwidth throttling of a network device component for telecommunications standard compliance.

FIG. 5 is a flowchart of an example process 500 associated with providing dynamic bandwidth throttling of a network device component for telecommunications standard compliance. In some implementations, one or more process blocks of FIG. 5 may be performed by a device (e.g., network device 210). In some implementations, one or more process blocks of FIG. 5 may be performed by another device or a group of devices separate from or including the device. Additionally, or alternatively, one or more process blocks of FIG. 5 may be performed by one or more components of a device 300, such as input component 310, switching component 320, output component 330, controller 340, and/or one or more components of a device 400, such as processor 420, memory 430, storage component 440, input component 450, output component 460, communication component 470, and/or the like.

As shown in FIG. 5, in some aspects, process 500 may include receiving traffic to be processed by a routing component of a line card of the device (block 510). For example, the device may receive traffic to be processed by a routing component of a line card of the device, as described above.

As further shown in FIG. 5, in some aspects, process 500 may include determining temperatures of an application-specific integrated circuit (ASIC) and a high bandwidth memory (HBM) of the routing component at a first time (block 520). For example, the device may determine temperatures of an ASIC and an HBM of the routing component at a first time, as described above.

As further shown in FIG. 5, in some aspects, process 500 may include determining whether the temperature of the ASIC satisfies a first ASIC temperature threshold or a second ASIC temperature threshold (block 530). For example, the device may determine whether the temperature of the ASIC satisfies a first ASIC temperature threshold or a second ASIC temperature threshold, as described above.

As further shown in FIG. 5, in some aspects, process 500 may include determining whether the temperature of the HBM satisfies a first HBM temperature threshold or a second HBM temperature threshold (block 540). For example, the device may determine whether the temperature of the HBM satisfies a first HBM temperature threshold or a second HBM temperature threshold, as described above.

As further shown in FIG. 5, in some aspects, process 500 may include selectively throttling processing of the traffic, by the routing component, by a first quantity when the temperature of the ASIC satisfies the first ASIC temperature threshold or the temperature of the HBM satisfies the first HBM temperature threshold, or throttling the processing of the traffic, by the routing component, by a second quantity when the temperature of the ASIC satisfies the second ASIC temperature threshold or the temperature of the HBM satisfies the second HBM temperature threshold (block 550). For example, the device may selectively throttle processing of the traffic, by the routing component, by a first quantity when the temperature of the ASIC satisfies the first ASIC temperature threshold or the temperature of the HBM satisfies the first HBM temperature threshold, or throttle the processing of the traffic, by the routing component, by a second quantity when the temperature of the ASIC satisfies the second ASIC temperature threshold or the temperature of the HBM satisfies the second HBM temperature threshold, as described above.

Process 500 may include additional implementations, such as any single implementation or any combination of implementations described below and/or in connection with one or more other processes described elsewhere herein.

In a first implementation, throttling the processing of the traffic by the first quantity or the second quantity includes throttling the processing of the traffic by the first quantity or the second quantity based on one or more of wide area network (WAN) ingress shaping, WAN egress throttling, fabric ingress throttling, fabric egress throttling, HBM ingress throttling, or HBM egress throttling.

In a second implementation, alone or in combination with the first implementation, throttling the processing of the traffic by the first quantity or the second quantity causes the device to comply with a telecommunications standard.

In a third implementation, alone or in combination with one or more of the first and second implementations, determining the temperatures of the ASIC and the HBM of the routing component at the first time includes determining the temperature of the ASIC based on a reading from an ASIC temperature sensor, and determining the temperature of the HBM based on a reading from one or more HBM temperature sensors.

In a fourth implementation, alone or in combination with one or more of the first through third implementations, process 500 includes determining temperatures of the ASIC and the HBM of the routing component at a second time; and increasing the processing of the traffic, by the routing component, by the first quantity when the temperature of the ASIC satisfies a third ASIC temperature threshold or the temperature of the HBM satisfies a third HBM temperature threshold.

In a fifth implementation, alone or in combination with one or more of the first through fourth implementations, process 500 includes causing an alarm message, indicating the throttling of the processing of the traffic by the first quantity or the second quantity, to be generated.

In a sixth implementation, alone or in combination with one or more of the first through fifth implementations, process 500 includes receiving an input parameter; and modifying, based on the input parameter, at least one of the first quantity, the second quantity, the first ASIC temperature threshold, the second ASIC temperature threshold, the first HBM temperature threshold, or the second HBM temperature threshold.

In a seventh implementation, alone or in combination with one or more of the first through sixth implementations, the first quantity is ten percent and results in a reduction of ten percent of the traffic being processed by the routing component, and the second quantity is twenty percent and results in a reduction of twenty percent of the traffic being processed by the routing component.

In an eighth implementation, alone or in combination with one or more of the first through seventh implementations, process 500 includes determining the temperature of the ASIC based on a reading from an ASIC temperature sensor; and determining the temperature of the HBM based on a reading from one or more HBM temperature sensors.

In a ninth implementation, alone or in combination with one or more of the first through eighth implementations, throttling the processing of the traffic by the first quantity includes throttling the processing of the traffic by the first quantity based on one or more of WAN ingress shaping by enabling or disabling packet processing engines in a lookup subsystem, WAN egress throttling by adjusting node shaping rates on WAN interfaces of the routing component, fabric ingress throttling by configuring a memory enqueueing subsystem node shaping rate, fabric egress throttling by configuring a grant rate limit for the memory enqueueing subsystem, HBM ingress throttling by reducing reads from the HBM, or HBM egress throttling by reducing writes to the HBM.

In a tenth implementation, alone or in combination with one or more of the first through ninth implementations, throttling the processing of the traffic by the first quantity or the second quantity includes throttling the processing of the traffic by the first quantity or the second quantity by throttling one or more resources associated with the ASIC, wherein the one or more resources is including one or more of a WAN ingress, a WAN egress, a fabric ingress, or a fabric egress.

In an eleventh implementation, alone or in combination with one or more of the first through tenth implementations, throttling the processing of the traffic by the second quantity includes throttling the processing of the traffic by the second quantity based on one or more of WAN ingress shaping by enabling or disabling packet processing engines in a lookup subsystem, WAN egress throttling by adjusting node shaping rates on WAN interfaces of the routing component, fabric ingress throttling by configuring a memory enqueueing subsystem node shaping rate, fabric egress throttling by configuring a grant rate limit for the memory enqueueing subsystem, HBM ingress throttling by reducing reads from the HBM, or HBM egress throttling by reducing writes to the HBM.

In an eleventh implementation, alone or in combination with one or more of the first through tenth implementations, the device complies with a telecommunications standard.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

As used herein, traffic or content may include a set of packets. A packet may refer to a communication structure for communicating information, such as a protocol data unit (PDU), a service data unit (SDU), a network packet, a datagram, a segment, a message, a block, a frame (e.g., an Ethernet frame), a portion of any of the above, and/or another type of formatted or unformatted unit of data capable of being transmitted via a network.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, by a network device, traffic to be processed by a routing component of a line card of the network device;
   determining, by the network device, a temperature of an application-specific integrated circuit (ASIC) and a temperature of a high bandwidth memory (HBM) of the routing component at a first time;
   determining, by the network device, whether the temperature of the ASIC satisfies a first ASIC temperature threshold or a second ASIC temperature threshold;
   determining, by the network device, whether the temperature of the HBM satisfies a first HBM temperature threshold or a second HBM temperature threshold;
   selectively:
      throttling, by the network device, processing of the traffic, by the routing component, by a first quantity when the temperature of the ASIC satisfies the first ASIC temperature threshold or the temperature of the HBM satisfies the first HBM temperature threshold; or
      throttling, by the network device, the processing of the traffic, by the routing component, by a second quantity when the temperature of the ASIC satisfies the second ASIC temperature threshold or the temperature of the HBM satisfies the second HBM temperature threshold;
   determining, by the network device, a temperature of the ASIC at a second time that occurs after the first time; and
   increasing, by the network device, the processing of the traffic, by the routing component, by the first quantity when the temperature of the ASIC at the second time satisfies a third ASIC temperature threshold.

2. The method of claim 1, wherein throttling the processing of the traffic by the first quantity or the second quantity comprises:
   throttling the processing of the traffic by the first quantity or the second quantity based on one or more of:
      wide area network (WAN) ingress shaping,
      WAN egress throttling,
      fabric ingress throttling,
      fabric egress throttling,
      HBM ingress throttling, or
      HBM egress throttling.

3. The method of claim 1, wherein throttling the processing of the traffic by the first quantity or the second quantity causes the network device to comply with a telecommunications standard.

4. The method of claim 1, wherein determining the temperature of the ASIC and the temperature HBM of the routing component at the first time comprises:
   determining the temperature of the ASIC based on a reading from an ASIC temperature sensor; and
   determining the temperature of the HBM based on a reading from one or more HBM temperature sensors.

5. The method of claim 1, further comprising:
   causing an alarm message, indicating the throttling of the processing of the traffic by the first quantity or the second quantity, to be generated.

6. The method of claim 1, further comprising:
   receiving an input parameter; and
   modifying, based on the input parameter, at least one of the first quantity, the second quantity, the first ASIC temperature threshold, the second ASIC temperature threshold, the first HBM temperature threshold, or the second HBM temperature threshold.

7. The method of claim 1, wherein throttling the processing of the traffic by the first quantity comprises:
   throttling the processing of the traffic by the first quantity based on one or more of:
      wide area network (WAN) ingress shaping by enabling or disabling packet processing engines in a lookup subsystem,
      WAN egress throttling by adjusting node shaping rates on WAN interfaces of the routing component,
      fabric ingress throttling by configuring a memory enqueueing subsystem node shaping rate, or fabric egress throttling by configuring a grant rate limit for the memory enqueueing subsystem.

8. A network device, comprising:
one or more memories; and
one or more processors to:
receive traffic to be processed by a routing component of a line card of the network device;
determine a temperature of an application-specific integrated circuit (ASIC) and a temperature of a high bandwidth memory (HBM) of the routing component at a first time;
determine whether the temperature of the ASIC satisfies a first ASIC temperature threshold or a second ASIC temperature threshold;
determine whether the temperature of the HBM satisfies a first HBM temperature threshold or a second HBM temperature threshold;
selectively:
throttle processing of the traffic, by the routing component, by a first quantity when the temperature of the ASIC satisfies the first ASIC temperature threshold or the temperature of the HBM satisfies the first HBM temperature threshold; or
throttle the processing of the traffic, by the routing component, by a second quantity when the temperature of the ASIC satisfies the second ASIC temperature threshold or the temperature of the HBM satisfies the second HBM temperature threshold;
generate an alarm message indicating the throttling of the processing of the traffic by the first quantity or the second quantity;
determine a temperature of the ASIC at a second time that occurs after the first time; and
increase the processing of the traffic, by the routing component, by the first quantity when the temperature of the ASIC at the second time satisfies a third ASIC temperature threshold.

9. The network device of claim 8, wherein the first quantity is ten percent and results in a reduction of ten percent of the traffic being processed by the routing component, and
wherein the second quantity is twenty percent and results in a reduction of twenty percent of the traffic being processed by the routing component.

10. The network device of claim 8, wherein the one or more processors, when determining the temperature of the ASIC and the temperature of the HBM of the routing component at the first time, are to:
determine the temperature of the ASIC based on a reading from an ASIC temperature sensor; and
determine the temperature of the HBM based on a reading from one or more HBM temperature sensors.

11. The network device of claim 8, wherein the one or more processors, when throttling the processing of the traffic by the first quantity, are to:
throttle the processing of the traffic by the first quantity based on one or more of:
wide area network (WAN) ingress shaping by enabling or disabling packet processing engines in a lookup subsystem,
WAN egress throttling by adjusting node shaping rates on WAN interfaces of the routing component,
fabric ingress throttling by configuring a memory enqueueing subsystem node shaping rate,
fabric egress throttling by configuring a grant rate limit for the memory enqueueing subsystem,
HBM ingress throttling by reducing reads from the HBM, or
HBM egress throttling by reducing writes to the HBM.

12. The network device of claim 8, wherein the one or more processors, when throttling the processing of the traffic by the first quantity or the second quantity, are to:
throttle the processing of the traffic by the first quantity or the second quantity by throttling one or more resources associated with the ASIC,
wherein the one or more resources include one or more of:
a wide area network (WAN) ingress,
a WAN egress,
a fabric ingress, or
a fabric egress.

13. The network device of claim 8, wherein the one or more processors, when throttling the processing of the traffic by the second quantity, are to:
throttle the processing of the traffic by the second quantity based on one or more of:
wide area network (WAN) ingress shaping by enabling or disabling packet processing engines in a lookup subsystem,
WAN egress throttling by adjusting node shaping rates on WAN interfaces of the routing component,
fabric ingress throttling by configuring a memory enqueueing subsystem node shaping rate,
fabric egress throttling by configuring a grant rate limit for the memory enqueueing subsystem,
HBM ingress throttling by reducing reads from the HBM, or
HBM egress throttling by reducing writes to the HBM.

14. The network device of claim 8, wherein the network device complies with a telecommunications standard.

15. A non-transitory computer-readable medium storing instructions, the instructions comprising:
one or more instructions that, when executed by one or more processors of a network device, cause the one or more processors to:
receive traffic to be processed by a routing component of a line card of the network device;
determine a temperature of an application-specific integrated circuit (ASIC) and a temperature of a high bandwidth memory (HBM) of the routing component at a first time;
determine whether the temperature of the ASIC satisfies a first ASIC temperature threshold or a second ASIC temperature threshold;
determine whether the temperature of the HBM satisfies a first HBM temperature threshold or a second HBM temperature threshold;
selectively:
throttle processing of the traffic, by the routing component, by a first quantity when the temperature of the ASIC satisfies the first ASIC temperature threshold or the temperature of the HBM satisfies the first HBM temperature threshold; or
throttle the processing of the traffic, by the routing component, by a second quantity when the temperature of the ASIC satisfies the second ASIC temperature threshold or the temperature of the HBM satisfies the second HBM temperature threshold;
determine a temperature of the ASIC at a second time that occurs after the first time; and
increase the processing of the traffic, by the routing component, by the first quantity when the temperature of the ASIC at the second time satisfies a third ASIC temperature threshold.

16. The non-transitory computer-readable medium of claim 15, wherein the one or more instructions, when executed by the one or more processors, further cause the one or more processors to:
generate an alarm message indicating the throttling of the processing of the traffic by the first quantity or the second quantity.

17. The non-transitory computer-readable medium of claim 15, wherein the one or more instructions, when executed by the one or more processors, further cause the one or more processors to:
receive an input parameter; and
modify, based on the input parameter, at least one of the first quantity, the second quantity, the first ASIC temperature threshold, the second ASIC temperature threshold, the first HBM temperature threshold, or the second HBM temperature threshold.

18. The non-transitory computer-readable medium of claim 15, wherein the one or more instructions, that cause the one or more processors to throttle the processing of the traffic by the first quantity, cause the one or more processors to:
throttle the processing of the traffic by the first quantity based on one or more of:
wide area network (WAN) ingress shaping by enabling or disabling packet processing engines in a lookup subsystem,
WAN egress throttling by adjusting node shaping rates on WAN interfaces of the routing component,
fabric ingress throttling by configuring a memory enqueueing subsystem node shaping rate, or
fabric egress throttling by configuring a grant rate limit for the memory enqueueing subsystem.

19. The non-transitory computer-readable medium of claim 15, wherein the one or more instructions, that cause the one or more processors to throttle the processing of the traffic by the first quantity, cause the one or more processors to:
throttle the processing of the traffic by the first quantity based on one or more of:
HBM ingress throttling by reducing reads from the HBM, or
HBM egress throttling by reducing writes to the HBM.

20. The non-transitory computer-readable medium of claim 15, wherein the one or more instructions, that cause the one or more processors to throttle the processing of the traffic by the second quantity, cause the one or more processors to:
throttle the processing of the traffic by the second quantity based on one or more of:
wide area network (WAN) ingress shaping by enabling or disabling packet processing engines in a lookup subsystem,
WAN egress throttling by adjusting node shaping rates on WAN interfaces of the routing component,
fabric ingress throttling by configuring a memory enqueueing subsystem node shaping rate,
fabric egress throttling by configuring a grant rate limit for the memory enqueueing subsystem,
HBM ingress throttling by reducing reads from the HBM, or
HBM egress throttling by reducing writes to the HBM.

* * * * *